(12) United States Patent
Han et al.

(10) Patent No.: US 11,662,981 B2
(45) Date of Patent: May 30, 2023

(54) LOW-POWER PROGRAMMABLE TRUNCATED MULTIPLICATION CIRCUITRY

(71) Applicant: ALIBABA GROUP HOLDING LIMITED, Grand Cayman (KY)

(72) Inventors: Wei Han, San Mateo, CA (US); Fei Sun, San Mateo, CA (US); Shuangchen Li, San Mateo, CA (US)

(73) Assignee: ALIBABA GROUP HOLDING LIMITED, George Town (KY)

( * ) Notice: Subject to any disclaimer, the term of this patent is extended or adjusted under 35 U.S.C. 154(b) by 75 days.

(21) Appl. No.: 17/035,159

(22) Filed: Sep. 28, 2020

(65) Prior Publication Data

US 2022/0100468 A1    Mar. 31, 2022

(51) Int. Cl.
*G06F 7/523* (2006.01)
(52) U.S. Cl.
CPC ...... *G06F 7/523* (2013.01); *G06F 2207/3852* (2013.01)
(58) Field of Classification Search
CPC .............. G06F 7/4876; G06F 7/523; G06F 2207/3852; G06F 2207/4812
See application file for complete search history.

(56) References Cited

U.S. PATENT DOCUMENTS

2017/0322773 A1* 11/2017 Tangudu ............... G06F 7/50

OTHER PUBLICATIONS

M. de la Guia Solaz, A Flexible Low Power DSP With a Programmable Truncated Multiplier, IEEE Transactions on Circuits and Systems—I: Regular Papers, vol. 59, No. 11, 2012 (Year: 2012).*
J.H Tu et al., Power-Efficient Pipelined Reconfigurable Fixed-Width Baugh-Wooley Multipliers, IEEE Transactions on Computers, vol. 58, No. 10, 2009 (Year: 2009).*
N. Petra et al., Design of Fixed-Width Multipliers With Linear Compensation Function, IEEE Transactions on Circuits and Systems—I: Regular Papers, vol. 58, No. 5, 2011 (Year: 2011).*
Intel 64 and IA-32 Architectures Software Developers Manual, vol. 3A: System Programming Guide, Part 1, 2016 (Year: 2016).*

(Continued)

*Primary Examiner* — Emily E Larocque
(74) *Attorney, Agent, or Firm* — Finnegan, Henderson, Farabow, Garrett & Dunner, LLP

(57) ABSTRACT

Methods, apparatuses, and truncated multiplication circuitry for truncated multiplication are provided. Truncated multiplication circuitry includes a control register that includes a first section configured to store a first value representing truncating a most significant bit (MSB) of a partial product of a multiplier and a multiplicand, and a second section configured to store a value representing a truncation mode. The truncated multiplication circuitry also includes control circuitry configured to truncate the MSB of the partial product based on the truncation mode if the first section stores the first value. A method includes: in response to receiving a multiplier and a multiplicand, determining a partial product of the multiplier and the multiplicand; receiving a first value representing truncating a most significant bit (MSB) of the partial product and a value representing a truncation mode; and truncating the MSB of the partial product based on the truncation mode.

20 Claims, 8 Drawing Sheets

(56) References Cited

OTHER PUBLICATIONS

Arm, Cortex-A1 Technical Reference Manual, Revision r3p2, 2010, at https://developer.arm.eom/documentation/ddi0344/k/system-control-coprocessor/system-control-coprocessor-registers/c1-control-register (Year: 2010).*

* cited by examiner

LOW-POWER PROGRAMMABLE TRUNCATED MULTIPLICATION CIRCUITRY

BACKGROUND

With advancement of semiconductor manufacturing technologies, more transistors can be fabricated with higher density in an integrated circuit. However, such an integrated circuit can face a challenge of fast-growing power consumption and heat generation. In some designs (referred to as "dark silicon"), some transistors of the integrated circuit must be powered off at their nominal operating voltage to avoid thermal damage to the operating integrated circuit.

Power consumption can be a critical concern to mobile devices (e.g., smartphones) and embedded devices (e.g., internet-of-things devices) because of their limited battery capacity. Heat dissipation and power consumption can be critical concerns to computer clusters (e.g., data centers, CPU farms, or cloud servers) because of their constraints on cooling costs and electric power costs. Heat dissipation and power consumption also limit performance of three-dimensional (3D) bonding semiconductors (e.g., 3D-NAND flash memory chips).

Multiplication circuits, such as multipliers ("MUL") and multiplier-accumulators ("MAC"), are fundamental building blocks and major or even dominant source of power consumption and heat generation of logical integrated circuits (e.g., a processor) that perform high-speed, complex mathematic operations (e.g., filtering, compression, or classification). For example, a logical integrated circuit dedicated for machine learning applications can perform one trillion to one quintillion operations (e.g., matrix calculations) per second, which can consume huge power and generate great heat. Therefore, technical solutions for low-power MULs and MACs are pursued.

SUMMARY OF THE DISCLOSURE

The embodiments of present disclosure provide methods and apparatuses for truncated multiplication. In an aspect, truncated multiplication circuitry is provided. The truncated multiplication circuitry includes a control register that includes a first section configured to store a first value representing truncating a most significant bit (MSB) of a partial product of a multiplier and a multiplicand, and a second section configured to store a value representing a truncation mode. The truncated multiplication circuitry also includes control circuitry configured to truncate the MSB of the partial product based on the truncation mode if the first section stores the first value.

In another aspect, a non-transitory computer-readable medium is provided, which stores a set of instructions that is executable by truncated multiplication circuitry to cause the truncated multiplication circuitry to perform a method. The method includes: in response to receiving a multiplier and a multiplicand, determining a partial product of the multiplier and the multiplicand; receiving a first value representing truncating a most significant bit (MSB) of the partial product and a value representing a truncation mode; and truncating the MSB of the partial product based on the truncation mode.

In yet another aspect, an apparatus for truncated multiplication is provided. The apparatus includes at least one memory for storing instructions and truncated multiplication circuitry configured to execute the instructions to cause the apparatus to perform: in response to receiving a multiplier and a multiplicand, determining a partial product of the multiplier and the multiplicand; receiving a first value representing truncating a most significant bit (MSB) of the partial product and a value representing a truncation mode; and truncating the MSB of the partial product based on the truncation mode.

In yet another aspect, a method for truncated multiplication is provided. The method includes: in response to receiving a multiplier and a multiplicand, determining a partial product of the multiplier and the multiplicand; receiving a first value representing truncating a most significant bit (MSB) of the partial product and a value representing a truncation mode; and truncating the MSB of the partial product based on the truncation mode.

In yet another aspect, an apparatus for truncated multiplication is provided. The apparatus includes a host processor and accelerator circuitry including truncated multiplication circuitry, the truncated multiplication circuitry configured to execute the instructions to cause the accelerator circuitry to perform: in response to receiving a multiplier and a multiplicand, determining a partial product of the multiplier and the multiplicand; receiving a first value representing truncating a most significant bit (MSB) of the partial product and a value representing a truncation mode; and truncating the MSB of the partial product based on the truncation mode.

BRIEF DESCRIPTION OF THE DRAWINGS

The accompanying drawings, which comprise a part of this specification, illustrate several embodiments and, together with the description, serve to explain the principles and features of the disclosed embodiments. In the drawings.

DETAILED DESCRIPTION

Figure 1A:
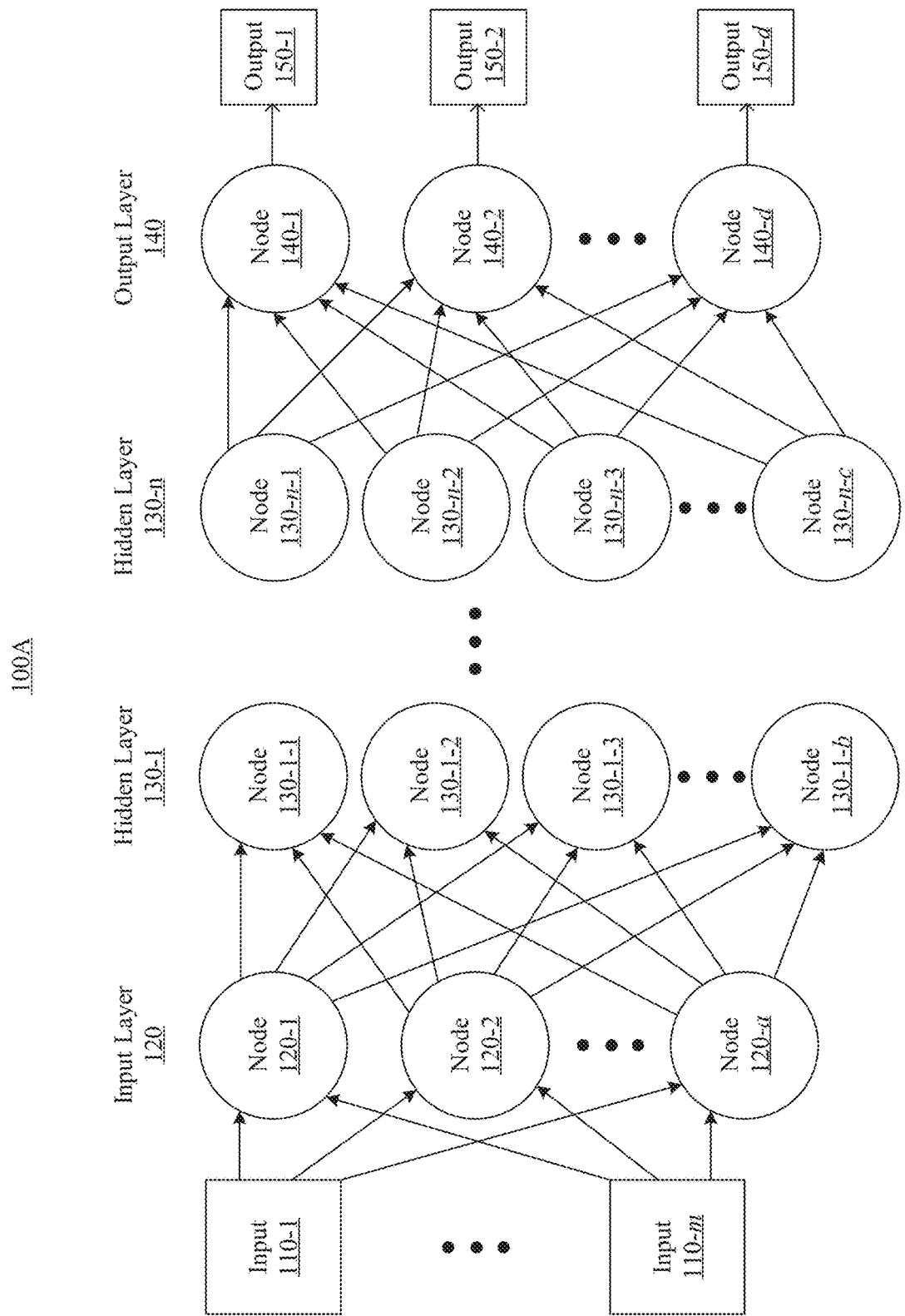
FIG. 1A illustrates a schematic representation of a neural network, consistent with some embodiments of this disclosure.

Reference will now be made in detail to example embodiments, examples of which are illustrated in the accompanying drawings. The following description refers to the accompanying drawings in which the same numbers in different drawings represent the same or similar elements unless otherwise represented. The implementations set forth in the following description of example embodiments do not represent all implementations consistent with the invention. Instead, they are merely examples of apparatuses, systems and methods consistent with aspects related to the invention as recited in the appended claims.

Multiplication circuitry (e.g., a MUL or a MAC) performs many multiplication operations. The multiplication operations involve high-frequency switching of voltage levels of circuits (e.g., bits of registers) in the multiplication circuitry, which can be their major source of power consumption. One way to reduce the power consumption of multiplication circuitry is to reduce multiplications unnecessary to its applications. For example, if an application requires low precision or prioritizes power saving over precision, some multiplication operations of the multiplication circuitry can be skipped (e.g., not fully performed) or disabled. Such techniques can be typically categorized into two types, "word-length reduction" techniques and "truncated multiplier" techniques. The word-length reduction techniques can truncate input operands to reduce the switching activity of the multiplication circuitry at a cost of high output noise. The truncated multiplier techniques can skip computing some sections (e.g., the lowest sections) of a partial product matrix of the operands to trade multiplication precision for reduction of power consumption. In some cases, the multiplication circuitry can perform a compensation to the results of a truncated multiplier technique to reduce truncation-induced errors.

In some existing solutions, multiplication circuitry can be forced to use a fixed, low bit width (e.g., 8 bits or 4 bits) for truncated multiplication operations, even when a bit width of the multiplication product (e.g., 16 bit or 32 bit) exceeds the fixed bit width. The multiplication circuitry can receive two or more operands as inputs, such as a multiplier and a multiplicand. Generally, a multiplication of an N-bit multiplier (N being an integer) and an M-bit multiplicand (M being an integer) yield a full-precision product of (N+M−1) or (N+M) bits. If the multiplication circuitry uses a fixed bit width of L bits (L being an integer smaller than N+M−1), then the multiplication circuitry can truncate (e.g., discard) (N+M−L) or (N+M−L−1) bits (e.g., bits at lower digit positions) of the full-precision product. The fixed bit width can be optimized for a specific application. However, such a fixed-bit-width design can lack flexibility to adapt for different applications that have different precision requirements.

In some existing solutions, a programmable, full-precision multiplier (or a "programmable truncated multiplier") can provide flexibility for different applications having various precision requirements. The programmable truncated multiplier can disable computing sections of a partial product matrix at run time, in which the sections can be dynamically selected based on an external control signal. By adjusting different truncation levels, the tradeoff between power savings and output precisions can be controlled in real time for various applications.

Existing programmable truncated multiplier typically disables computing the lower sections (e.g., the lower digit positions) of the partial product matrix. Such a scheme is effective in reducing power consumption while maintaining output precision for large-value multipliers and multiplicands. However, if the bit widths of multipliers and multiplicands are smaller than the bit width of the programmable truncated multiplier, its gain in power saving can deteriorate to a large extent. For example, in a case when a low-bit (e.g., 4-bit) multiplier and a low-bit (e.g., 4-bit) multiplicand are inputted to a high-bit (e.g., 32-bit) programmable truncated multiplier, the multiplier and multiplicand can typically be extended (e.g., by padding 28 leading zeroes or ones) to the same bit width of the programmable truncated multiplier for calculation. Those extension bits are at the highest sections (e.g., the highest digit positions) of the multiplier and the multiplicand. In such a case, even the programmable truncated multiplier disables computing the lowest sections of the partial product, the highest sections of the partial product matrix are still computed but contribute little (if any) significance to the final result.

Embodiments of this disclosure provides a technical solution for implementing truncated multiplication circuitry to allow dynamically disabling computing of any combination of the highest sections or the lowest sections of a partial product of operands (e.g., a multiplier and a multiplicand) to generate a truncated product. To balance speed and effectiveness, the provided technical solution can also implement multi-mode hardware-based detection of extension bits of the operands. By doing so, the multiplication circuitry can control the precision of its output results in real time and provide programmable truncation levels to adapt for different requirements of various applications. Such multiplication circuitry can be integrated into many types of general integrated circuits (e.g., a RISC-V CPU) or specific chips (e.g., neural network accelerator circuitry) that perform complex mathematical operations. For example, the general integrated circuits or specific chips may execute a machine learning model. The machine learning model, as used herein, may include an algorithm, a mathematical model, or computerized procedures that enables a computer system to automatically learn and improve certain types of tasks (e.g., prediction or classification) from training data (e.g., data used for adapting the machine learning technique towards more accurate performances) without being explicitly programmed by human beings.

Consistent with embodiments of this disclosure, for ease of description, a neural network model is described in association with the provided systems, apparatuses, methods, and non-transitory computer-readable media, with the understanding that aspects of this disclosure also apply equally to other applications (e.g., electrocardiographic signal filtering, fall detection on a wearable device, discrete wavelet transforms, or any type of application that involves intense multiplication operations). Neural network models (e.g., DNNs) usually include massive matrix multiplication operations, which can consume large computation and storage resources and impose challenges for deploying them to devices that have limited computation capacity, such as internet-of-things (IoT) devices or mobile devices (e.g., a smartphone).

The "neural network," as used herein, can refer to a computing model for analyzing underlying relationships in a set of input data by way of mimicking human brains. Similar to a biological neural network, the neural network can include a set of connected units or nodes (referred to as "neurons"), structured as different layers, where each connection (also referred to as an "edge") can receive and send a signal between neurons of neighboring layers in a way similar to a synapse in a biological brain. The signal can be any type of data (e.g., a real number). Each neuron can receive one or more signals as an input and output another signal by applying a non-linear function to the inputted signals. Neurons and edges can typically be weighted by corresponding weights to represent the "knowledge" the neural network has acquired. During a training process (similar to a learning process of a biological brain), the weights can be adjusted (e.g., by increasing or decreasing their values) to change the strengths of the signals between the neurons to improve the performance accuracy of the neural network. Neurons can apply a thresholding function (referred to as an "activation function") to its output values of the non-linear function such that an signal is outputted only when an aggregated value (e.g., a weighted sum) of the output values of the non-linear function exceeds a threshold determined by the thresholding function. Different layers of neurons can transform their input signals in different manners (e.g., by applying different non-linear functions or activation functions). The output of the last layer (referred to as an "output layer") can output the analysis result of the neural network, such as, for example, a categorization of the set of input data (e.g., as in image recognition cases), a numerical result, or any type of output data for obtaining an analytical result from the input data.

The "training" of the neural network, as used herein, can refer to a process of improving the accuracy of the output of the neural network. Typically, the training can be categorized into three types: "supervised training," "unsupervised training," and "reinforcement training." In the supervised training, a set of target output data (also referred to as "labels" or "ground truth") can be generated based on a set of input data using a method other than the neural network. The neural network can then be fed with the set of input data to generate a set of output data that is typically different from the target output data. Based on the difference between the output data and the target output data, the weights of the neural network can be adjusted in accordance with a rule. If such adjustments are successful, the neural network can generate another set of output data more similar to the target output data in a next iteration using the same input data. If such adjustments are not successful, the weights of the neural network can be adjusted again. After a sufficient number of iterations, the training process can be terminated in accordance with one or more predetermined criteria (e.g., the difference between the final output data and the target output data is below a predetermined threshold, or the number of iterations reaches a predetermined threshold). The trained neural network can be applied to analyze other input data.

In the unsupervised training, the neural network is trained without any external gauge (e.g., labels) to identify patterns in the input data rather than generating labels for them. Typically, the neural network can analyze shared attributes (e.g., similarities and differences) and relationships among the elements of the input data in accordance with one or more predetermined rules or algorithms (e.g., principal component analysis, clustering, anomaly detection, or latent variable identification). The trained neural network can extrapolate the identified relationships to other input data.

In the reinforcement learning, the neural network is trained without any external gauge (e.g., labels) in a trial-and-error manner to maximize benefits in decision making. The input data sets of the neural network can be different in the reinforcement training. For example, a reward value or a penalty value can be determined for the output of the neural network in accordance with one or more rules during training, and the weights of the neural network can be adjusted to maximize the reward values (or to minimize the penalty values). The trained neural network can apply its learned decision making knowledge to other input data.

It should be noted that the apparatus, systems and methods disclosed herein can be used in various neural network-based architectures, such as DNNs, convolutional neural networks (CNNs), recurrent neural networks (RNNs), or any architecture or algorithm that can cluster or label input data using machine perceptions ("artificial neurons" or "neurons"). The neural network-based architectures can be used for various applications, such as image classification, three-dimensional object recognition, machine translation, or transductive learning on graphs.

It should also be noted that the apparatus, systems and methods disclosed herein can also be configured for various architectures, such as a central processing unit (CPU), a graphics processing unit (GPU), a neural network processing unit (NPU), a field programmable gate array (FPGA), a tensor processing unit (TPU), a heterogeneous acceleration processing unit (HAPU), an application-specific integrated circuit (ASIC), or any circuit that is capable of processing data.

By way of example, FIG. 1A illustrates a schematic representation of a neural network 100A. As depicted in FIG. 1A, neural network 100A can include an input layer 120 that receives inputs, including input 110-1, . . . , input 110-$m$ ($m$ being an integer). "Inputs" can include an image, text, or any other structure or unstructured data for processing by neural network 100A. In some embodiments, neural network 100A can receive a plurality of inputs simultaneously. For example, in FIG. 1A, neural network 100A can receive m inputs simultaneously. In some embodiments, input layer 120 can receive m inputs in succession such that input layer 120 receives input 110-1 in a first cycle (e.g., in a first inference) and pushes data from input 110-1 to a hidden layer (e.g., hidden layer 130-1), then receives a second input in a second cycle (e.g., in a second inference) and pushes data from input the second input to the hidden layer, and so on. Input layer 120 can receive any number of inputs in the simultaneous manner, the successive manner, or any manner of grouping the inputs.

Input layer 120 can include one or more nodes, including node 120-1, node 120-2, . . . , node 120-$a$ ($a$ being an integer). "Nodes" ("machine perceptions" or "neurons") can model the functioning of a biological neuron. Each node can apply an activation function to received inputs (e.g., one or more of input 110-1, . . . , input 110-$m$). An activation function can include a Heaviside step function, a Gaussian function, a multiquadratic function, an inverse multiquadratic function, a sigmoidal function, a rectified linear unit (ReLU) function (e.g., a ReLU6 function or a Leaky ReLU function), a hyperbolic tangent ("tanh") function, or any non-linear function. The output of the activation function can be weighted by a weight associated with the node. A weight can include a positive value between 0 and 1, or any numerical value that can scale outputs of some nodes in a layer more or less than outputs of other nodes in the same layer.

As further depicted in FIG. 1A, neural network 100A includes multiple hidden layers, including hidden layer 130-1, . . . , hidden layer 130-$n$ ($n$ being an integer). When neural network 100A includes more than one hidden layers, it can be referred to as a "deep neural network" (DNN). Each hidden layer can include one or more nodes. For example, in FIG. 1A, hidden layer 130-1 includes node 130-1-1, node 130-1-2, node 130-1-3, . . . , node 130-1-$b$ ($b$ being an integer), and hidden layer 130-$n$ includes node 130-$n$-1, node 130-$n$-2, node 130-$n$-3, . . . , node 130-$n$-$c$ ($c$ being an integer). Similar to nodes of input layer 120, nodes of the hidden layers can apply the same or different activation functions to outputs from connected nodes of a previous layer, and weight the outputs from the activation functions by weights associated with the nodes.

As further depicted in FIG. 1A, neural network 100A can include an output layer 140 that finalizes outputs, including output 150-1, output 150-2, . . . , output 150-$d$ ($d$ being an integer). Output layer 140 can include one or more nodes, including node 140-1, node 140-2, . . . , node 140-$d$. Similar to nodes of input layer 120 and of the hidden layers, nodes of output layer 140 can apply activation functions to outputs from connected nodes of a previous layer and weight the outputs from the activation functions by weights associated with the nodes.

Although nodes of each hidden layer of neural network 100A are depicted in FIG. 1A to be connected to each node of its previous layer and next layer (referred to as "fully connected"), the layers of neural network 100A can use any connection scheme. For example, one or more layers (e.g., input layer 120, hidden layer 130-1, . . . , hidden layer 130-$n$, or output layer 140) of neural network 100A can be connected using a convolutional scheme, a sparsely connected scheme, or any connection scheme that uses fewer connections between one layer and a previous layer than the fully connected scheme as depicted in FIG. 1A.

Moreover, although the inputs and outputs of the layers of neural network 100A are depicted as propagating in a forward direction (e.g., being fed from input layer 120 to output layer 140, referred to as a "feedforward network") in FIG. 1A, neural network 100A can additionally or alternatively use backpropagation (e.g., feeding data from output layer 140 towards input layer 120) for other purposes. For example, the backpropagation can be implemented by using long short-term memory nodes (LSTM). Accordingly, although neural network 100A is depicted similar to a convolutional neural network (CNN), neural network 100A can include a recurrent neural network (RNN) or any other neural network.

Figure 1B:
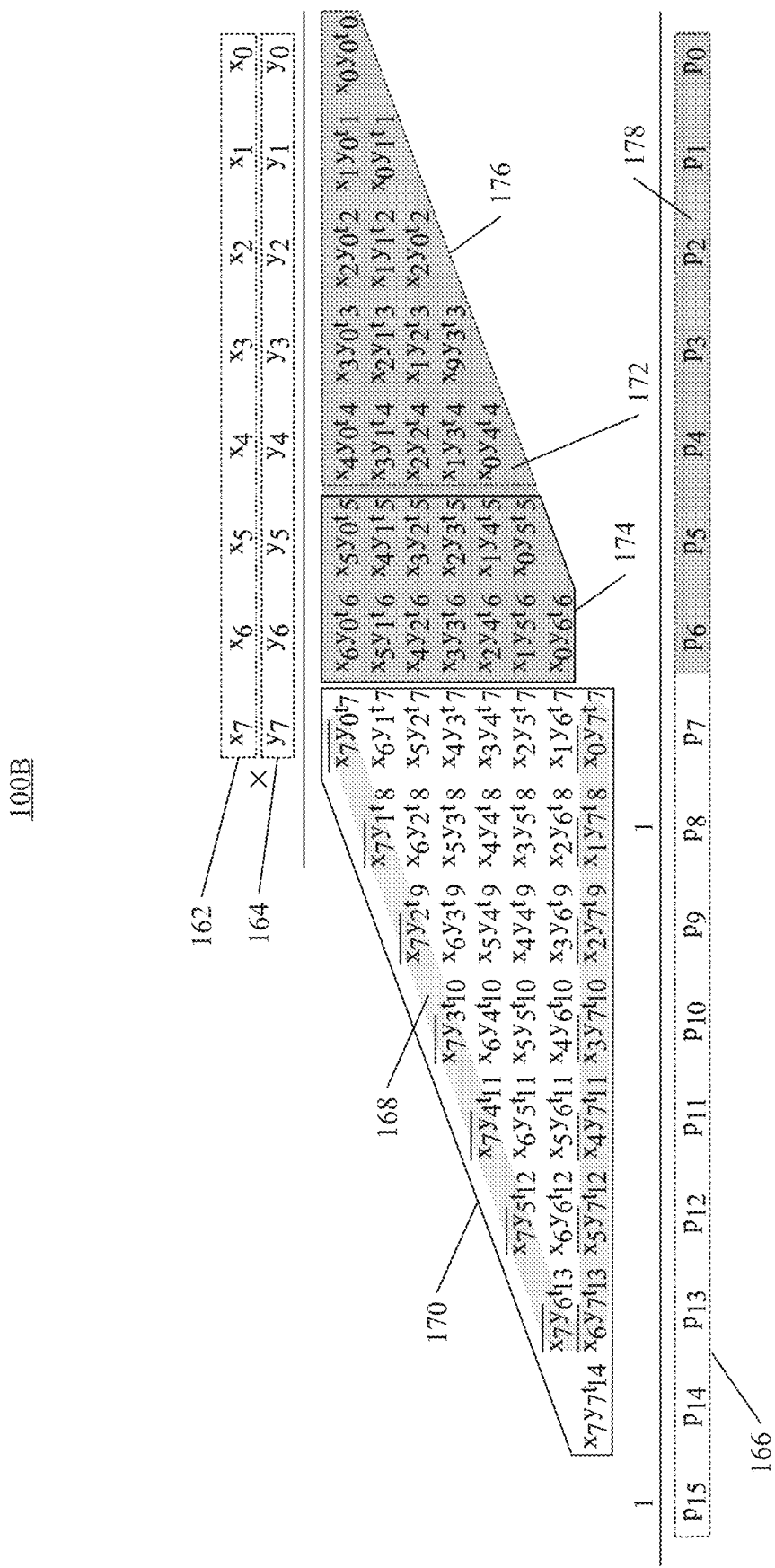
FIG. 1B illustrates an example partial product matrix of multiplication circuitry, consistent with some embodiments of this disclosure.

Multiplication circuitry (e.g., a MUL or a MAC) can determine an arithmetic product of a multiplier and a multiplicand using various algorithms, such as a Baugh-Wooley algorithm, a Booth-Wallace tree algorithm, array multiplication, a Dadda tree algorithm, or a canonical signed digit algorithm. By way of example, FIG. 1B illustrates an example partial product matrix 100B of multiplication circuitry, consistent with some embodiments of this disclosure. In FIG. 1B, the multiplication circuitry can receive a multiplier 162 and a multiplicand 164 to determine a full-precision product 166. Multiplier 162 has 8 binary bits (represented by $x_0$ through $x_7$ inside a dotted box). Multiplicand 164 has 8 binary bits (represented by $y_0$ through $y_7$ inside a dotted box). A least significant bit (LSB), as used herein, can refer to a bit position representing a unit value (e.g., the lowest order) in a binary number (e.g., determining whether the binary number is even or odd). A most significant bit (MSB), as used herein, can refer to a bit position representing the greatest value (e.g., the highest order) in a binary number. For a signed binary number (i.e., carrying a sign "+" or "−"), its MSB can also represent the sign (e.g., "0" representing "+" and "1" representing "−", or vice versa). Typically, a number can be represented with its MSB on the left and its LSB on the right. For example, in FIG. 1B, the MSB and LSB of multiplier 162 is $x_7$ and $x_0$, respectively. When used in plurals, the "MSBs" of a number can refer to consecutive bit positions in a high-to-low order that starts from the bit position representing the greatest value or a sign of the number, and the "LSBs" of a number can refer to consecutive bit positions in a low-to-high order that starts from the bit position representing the unit value. For example, in FIG. 1B, "$y_7 y_6 \ldots y_j$" where $j>1$ can be referred to as the MSBs of multiplicand 164, and "$y_j \ldots y_2 y_1$" where $j<7$ can be referred to as the LSBs of multiplicand 164.

In FIG. 1B, the multiplication circuitry can generate partial product matrix 100B using a modified Baugh-Wooley algorithm. Multiplier 162 can be multiplied to each digit of multiplicand 164 from right to left to generate a partial product. Each digit of the partial product can be referred to as a "bit product" herein. At a physical level of multiplication circuitry, a bit "1" and "0" can be represented by a higher voltage and a lower voltage, respectively, in a circuitry element (e.g., a transistor). A bit product can be implemented by a 2-input logic AND gate circuit, and its output (e.g., $x_i y_j$) can depend on its logic AND operation on its two inputs (e.g., $x_i$ and $y_j$).

For example, multiplying multiplier 162 to the lowest digit (i.e., $y_0$) of multiplicand 164 can generate a partial product $x_i y_0$ where i=0 . . . 7, which is represented at the top row of partial product matrix 100B with a bit product $x_0 y_0$ aligned with the column of $y_0$. Multiplying multiplier 162 to the second lowest digit (i.e., $y_1$) of multiplicand 164 can generate a partial product $x_i y_1$ where i=0 . . . 7, which is represented at the second top row of partial product matrix 100B with a bit product $x_0 y_1$ aligned with the column of $y_1$. By multiplying multiplier 162 to each digit of multiplicand 164, eight partial products can be generated, in which each partial product can be represented by a row of bit products (e.g., $x_i y_j$ where i, j=0 . . . 7) having a bit width of eight. The LSB of each partial product is aligned with the corresponding bit of multiplicand 164 in the same column. The eight partial products and the ninth row form partial product matrix 100B.

The modified Baugh-Wooley algorithm can change the logic operation for bit products in region 168 (represented by an angle-shape gray belt in FIG. 1B) from a logic AND to a logic NOT-AND ("NAND"). For example, the values of bit products outside region 168 (e.g., represented by $x_i y_j$) can be determined as $x_i \wedge y_j$, where "$\wedge$" represents a logic AND operation. The values of bit products inside region 168 (e.g., represented by $\overline{x_i y_j}$) can be determined as $\overline{x_i \wedge y_j}$, where "$\overline{\wedge}$" represents a logic NAND operation. Further, the modified Baugh-Wooley algorithm can add a ninth row including two 1's, in which the first "1" is placed one-digit left (i.e., at column $p_8$ in FIG. 1B) of the MSB of the top row of partial product matrix 100B, and the second "1" is placed one-digit left (i.e., at column $p_{15}$) of the MSB of the bottom row of partial product matrix 100B. By adding the rows (including the ninth row) of partial product matrix 100B column by column (e.g., summing all bit products having the same $y_j$ where j=0 . . . 7), the multiplication circuitry can generate full-precision product 166 (e.g., including $p_0$ to $p_{15}$). Full-precision product 166 has 16 binary bits (represented by $p_0$ through $p_{15}$ inside a dotted box).

In some embodiments, the multiplication circuitry can store a partial product in a register during a multiplication operation. The multiplication circuitry can generate a next partial product and add it (with correct column alignment) to the partial product stored in the register, then store the sum to the same register. By repeating such a process, the multiplication circuitry can generate full-precision product 166, using a single register, without generating and storing the entire partial product matrix 100B.

Truncating full-precision product 166 can reduce computation complexity and power consumption. The "truncating," as used herein, can include any operation of disabling computation and removing the results thereof from an output of the operation. For example, truncating a bit stored in a register can be implemented by preventing the circuitry element (e.g., a transistor) storing the bit from switching states (e.g., changing from a higher voltage to a lower voltage, or vice versa). Because switching states consumes power, by doing so, the power consumption of the truncated bit of the register can go to substantially zero (e.g., only consuming a leakage current).

In some embodiments, the multiplication circuitry can dynamically truncate sections of partial product matrix 100B by introducing a control bit $t_j$ for each column j (j=0 . . . 14) of partial product matrix 100B. In such a case, the partial products $x_i y_j$ becomes $x_i y_j t_j$, and $x_i y_j t_j$ can be determined as $x_i \wedge y_j \wedge t_j$ using a 3-input logic AND operation (e.g., by replacing the 2-input AND logic gate circuit with a 3-input AND logic circuit). Similarly, $\overline{x_i y_j}$ becomes $\overline{x_i y_j} t_j$ that can be determined as $\overline{x_i \wedge y_j} \wedge t_j$ using a 3-input logic AND-NAND operation (e.g., by replacing the 2-input NAND logic gate circuit with a 3-input AND-NAND logic circuit).

The multiplication circuitry can receive the control bits $t_j$ (e.g., a voltage signal representing values of "1" or "0") from an external source (e.g., an external register). After receiving $t_j$, the multiplication circuitry can enable or disable computing an entire column of partial product matrix 100B. During run time of an application, the multiplication circuitry can enable or disable any combination of the columns of partial product matrix 100B in any manner based on the received control bits $t_j$ to accommodate any power-reduction or precision demands of the application. Such multiplication circuitry can be referred to as a "programmable truncated multiplication circuitry" herein.

For example, as illustrated in FIG. 1B, if the multiplication circuitry uses a single register to stored summed partial products and receives $t_6$=0, the multiplication circuitry can skip calculating any bit product in column $p_6$ because the 3-input logic AND operation always generates output "0" due to $t_6$=0. By doing so, the multiplication circuitry can skip switching states of the circuitry element corresponding to column $p_6$ in the single register because the sum of the bit products in column $p_6$ always yields zero by logic due to $t_6$=0. In the final output, bit $p_6$ of full-precision product 166 is 0 as a result, which can be referred to as "column 6 is truncated." In some embodiments, the multiplication circuitry that uses the single register can receives T (T being an integer) consecutive zero-value control bits corresponding to T columns. For example, the T consecutive zero-value control bits can start from the LSB (e.g., $t_0, t_1 \ldots t_T$=0), or start from the MSB (e.g., $t_{14}, t_{13} \ldots t_{14-T+1}$=0). It should be noted that the multiplication circuitry can receive the zero-value control bits in various manners, which is not limited to the above-described example embodiments.

In FIG. 1B, partial product matrix 100B can include a most significant part (MSP) 170 (enclosed by a solid-line pentagon) and a least significant part (LSP) 172 (overlapped by a gray trapezoid). MSP 170 includes the most significant M (M=8 in FIG. 1B as an example) columns (e.g., columns 7-14) of partial product matrix 100B, and LSP 172 includes the least significant N (N=7 in FIG. 1B as an example) columns (i.e., columns 0-6) of partial product matrix 100B. LSP 172 can be further divided into two parts, an LSP major part ("LSPmajor") 174 (enclosed by a solid-line pentagon inside LSP 172) and an LSP minor part ("LSPminor") 176 (enclosed by a dotted-line trapezoid inside LSP 172). LSPmajor 174 can include the most significant h (h=2 in FIG. 1B as an example) columns (e.g., columns 5-6) of LSP 172, and LSPminor 176 can include the least significant N−h (N−h=5 in FIG. 1B as an example) columns (e.g., columns 0-4) of LSP 172.

In some embodiments, if full-precision product 166 is not needed, the multiplication circuitry can truncate full-precision product 166 to generate a truncated product. Typically, the multiplication circuitry can truncate columns at lower digit positions of partial product matrix 100B. For example, the multiplication circuitry can truncate LSP 172 and use MSP 170 to generate the truncated product. In such a case, the truncated product can include $p_7$ to $p_{15}$, where $p_0$ to $p_6$ can be referred to as truncated bits 178 (represented by a gray area inside full-precision product 166). In some embodiments, to adjust the tradeoff between power consumption and output accuracy, the multiplication circuitry can further enable computation of LSPmajor 174 and truncate LSPminor 176, in which the truncated product includes (M+h) columns where h is adjustable in response to different applications or different stages of the same application. For example, if LSPminor 176 is truncated, the truncated product can be MSP 170 plus LSPmajor 174, which includes $p_5$ to $p_{15}$ in FIG. 1B.

In some embodiments, to reduce the error introduced by truncation, the multiplication circuitry can compensate the truncated product by adding a compensation value to it such that a variance and a mean of the error can be reduced. In some embodiments, the multiplication circuitry can add the compensation value to the truncated product after each multiplication operation, which can be referred to as "operation-level compensation" herein. For example, the compensation value of the operation-level compensation can be determined based on a truncated part (e.g., LSP 172 or LSPminor 176) of partial product matrix 100B, such as a constant value or a function of one or more values of the bit products in the truncated part. In some embodiments, an application can include a series of multiplications, and the multiplication circuitry can add the compensation value to the final product of the series of multiplications rather than adding individual compensation values after each operation, which can be referred to as "system-level compensation" herein. For example, the compensation value of the system-level compensation can be determined as a product of an estimated bias multiplied by a total number of the multiplications performed in the application. The compensation (e.g., either operation-level or system-level) can be implemented as software (e.g., no specific-purpose circuitry being used) or hardware (e.g., using a specific-purpose circuitry), which can be referred to as "software compensation" and "hardware compensation" herein, respectively.

In some cases, merely truncating the columns at lower digit positions of partial product matrix 100B (e.g., LSP 172 or LSPminor 176) might not achieve optimized power savings. For example, if the bit width (i.e., 8) of multiplier 162 and the bit width (i.e., 8) of multiplicand 164 are smaller than the bit width (e.g., 32) of the multiplication circuitry, the LSP-based truncation can decrease the precision of the truncated product without reducing computation complexity.

Figure 1C:
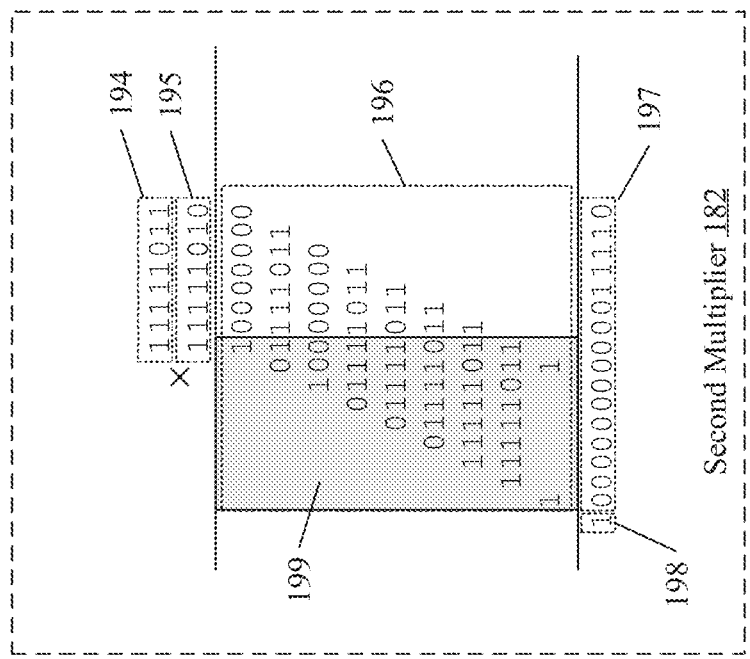
FIG. 1C illustrates an example multiplication between two operands, consistent with some embodiments of this disclosure.
Figure 1C:
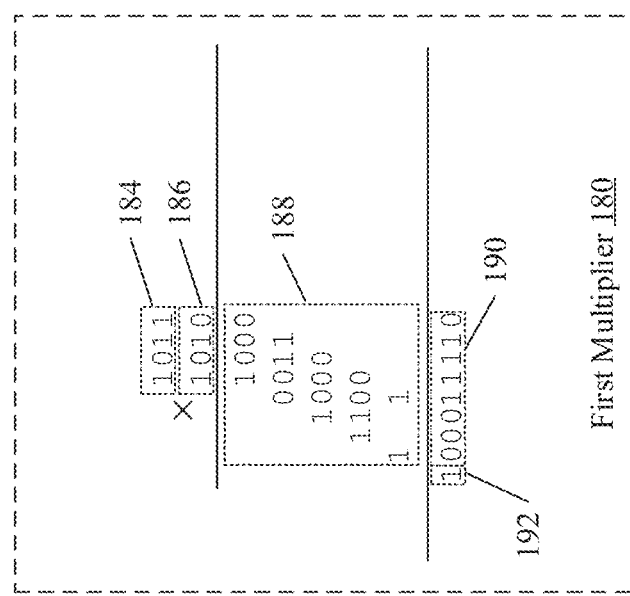

By way of example, FIG. 1C illustrates an example multiplication between two operands, consistent with some embodiments of this disclosure. FIG. 1C illustrates first multiplication circuitry 180 and second multiplication circuitry 182, represented by dashed boxes. First multiplication circuitry 180 and second multiplication circuitry 182 can determine a product by executing a modified Baugh-Wooley algorithm (e.g., similar to the modified Baugh-Wooley algorithm in FIG. 1B).

First multiplication circuitry 180 has a bit width of 8 and can receive 4-bit operands for multiplication, such as a 4-bit, signed multiplier 184 and a 4-bit, signed multiplicand 186.

Signed multiplier 184 is a decimal number "−5" represented by a signed binary number "1011" in Two's Complement format, and signed multiplicand 186 is a decimal number "−6" represented by a signed binary number "1010" in Two's Complement format. Two's Complement is a format for representing signed binary numbers. Under Two's Complement, where a signed binary number having leading zeros is positive, and a signed binary number having leading ones is negative. It should be noted that signed numbers can use various representations (e.g., a signed magnitude format, One's Complement, or Two's Complement), which are not limited to the examples as shown and described herein.

After generating a partial product matrix 188, first multiplication circuitry 180 can sum partial product matrix 188 column by column to generate a 9-bit final product "100011110" that includes an 8-bit, signed product 190 (e.g., "00011110") and an overflow bit 192 (i.e., "1"). Signed product 190 is the correct result, which is a decimal number "30" represented by a signed binary number "11110" with three leading zeros. First multiplication circuitry 180 can then discard overflow bit 192 and output signed product 190.

Second multiplication circuitry 182 can perform the same multiplication between "−5" and "−6." As illustrated in FIG. 1C, second multiplication circuitry 182 has a bit width of 16 and can receive 8-bit operands for multiplication, such as an 8-bit, signed multiplier 194 and an 8-bit, signed multiplicand 195. Signed multiplier 194 is a decimal number "−5" represented by a signed binary number "11111011" in Two's Complement format, and signed multiplicand 195 is a decimal number "−6" represented by a signed binary number "11111010" in Two's Complement format. Under Two's Complement, both "1011" and "11111011" represent the decimal number "−5," and both "1010" and "11111010" represent the decimal number "−6."

After generating a partial product matrix 196 that includes an MSP 199 (represented by a gray box), second multiplication circuitry 182 can sum partial product matrix 196 column by column to generate a 17-bit final product "10000000000011110" that includes a 16-bit, signed product 197 (i.e., "0000000000011110") and an overflow bit 198 (i.e., "1"). Signed product 197 is the correct result, which is a decimal number "30" represented by a signed binary number "11110" with eleven leading zeros. Second multiplication circuitry 182 can then discard overflow bit 198 and output signed product 197.

As illustrated in FIG. 1C, if MSP 199 is truncated, signed product 197 can remain the same. That is, at least 9 bits of signed product 197 does not contribute to the correct final result but consumes over 50% of power. For example, the rightmost column of MSP 199 includes six 1's, which would cause second multiplication circuitry 182 to perform many operations that eventually contributes nothing to the final result. If MSP 199 can be truncated, not only the precision of the final result is unaffected, but also the power consumption can be greatly reduced.

The above-described challenges in second multiplication circuitry 182 of FIG. 1C can frequently occur when the multiplier and the multiplicand have small values or when their bit widths are extended. In some embodiments, the multiplication circuitry can perform bit-width extension if the input operands have bit widths lower than the bit width of the multiplication circuitry. Bit-width extension can convert the bit widths of the operands to match the bit width of the multiplication circuitry. For example, when signed multiplier 184 and signed multiplicand 186 are inputted to second multiplication circuitry 182, they can be extended to increase their bit widths to 8.

To extend a bit width of a binary number, its MSB can be appended to one or more bit positions having orders higher than its MSB. If such extension preserves a sign of a signed number, it can be referred to as "sign extension" herein. To preserve both the sign and value of a number in the sign extension, the number can be represented by One's Complement or Two's Complement format. For example, signed multiplier 184 can be extended by appending its MSB "1" to before its MSB to generate signed multiplier 194 (i.e., "11111011"), and signed multiplicand 186 can be extended by appending its MSB "1" before its MSB to generate signed multiplicand 195 (i.e., "11111010"). The appended bits that leads the original bits of a number can be referred to as "sign-extension bits" herein. The sign-extension bits can be all zeros or all ones because the MSB is either "0" or "1." For example, the sign-extension bits of signed multiplier 194 or signed multiplicand 195 are "1111."

In an integrated circuit (e.g., a neural network accelerator) that performs operations related to a neural network model, multiplication circuitry (e.g., a MUL or a MAC) of the integrated circuit can receive a multiplier and a multiplicand that have small values or bit widths lower than the bit width of the multiplication circuitry. For example, parameters (e.g., weights, inputs of activation functions, or outputs of activation functions) of a neural network model can use a bit width lower than the bit width of the multiplication circuitry. In another example, parameters of some layers of the neural network model might have large values, but parameters of some other layers of the neural network model can have small values. In those situations, truncating the MSP side of the multiplication can reduce computation complexity, increase operation speed, and decrease power consumption, without affecting the precision of the final result. In those cases, truncating the LSP side of the multiplication does not carry such gains, and the precision of the final results deteriorates. In some cases, the multiplication circuitry can truncate both the MSP side and the LSP side to further reduce power consumption and provide flexibility to even more different applications.

Figure 2A:
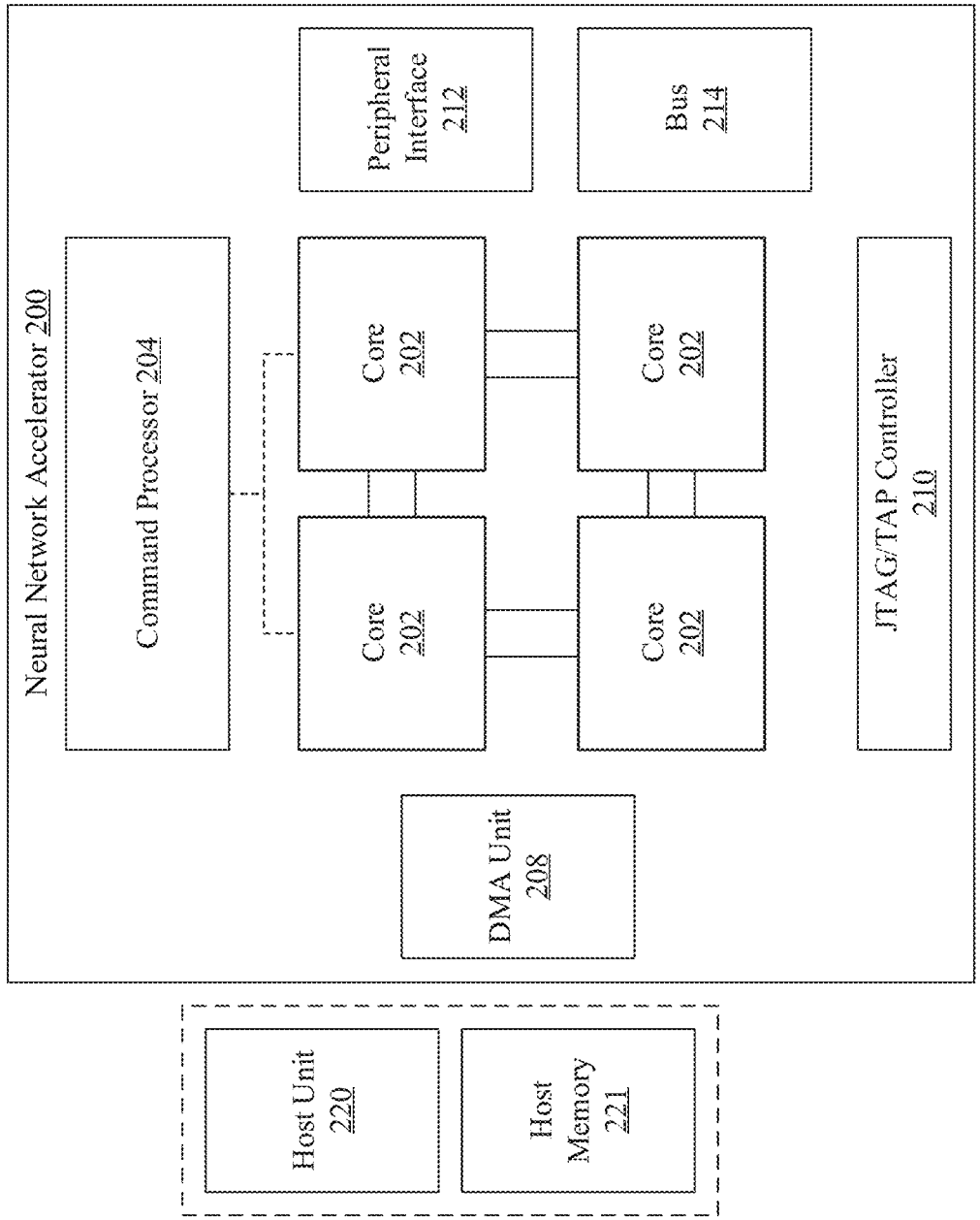
FIG. 2A illustrates a schematic representation of an example configuration of a neural network accelerator, consistent with some embodiments of this disclosure.
Figure 2B:
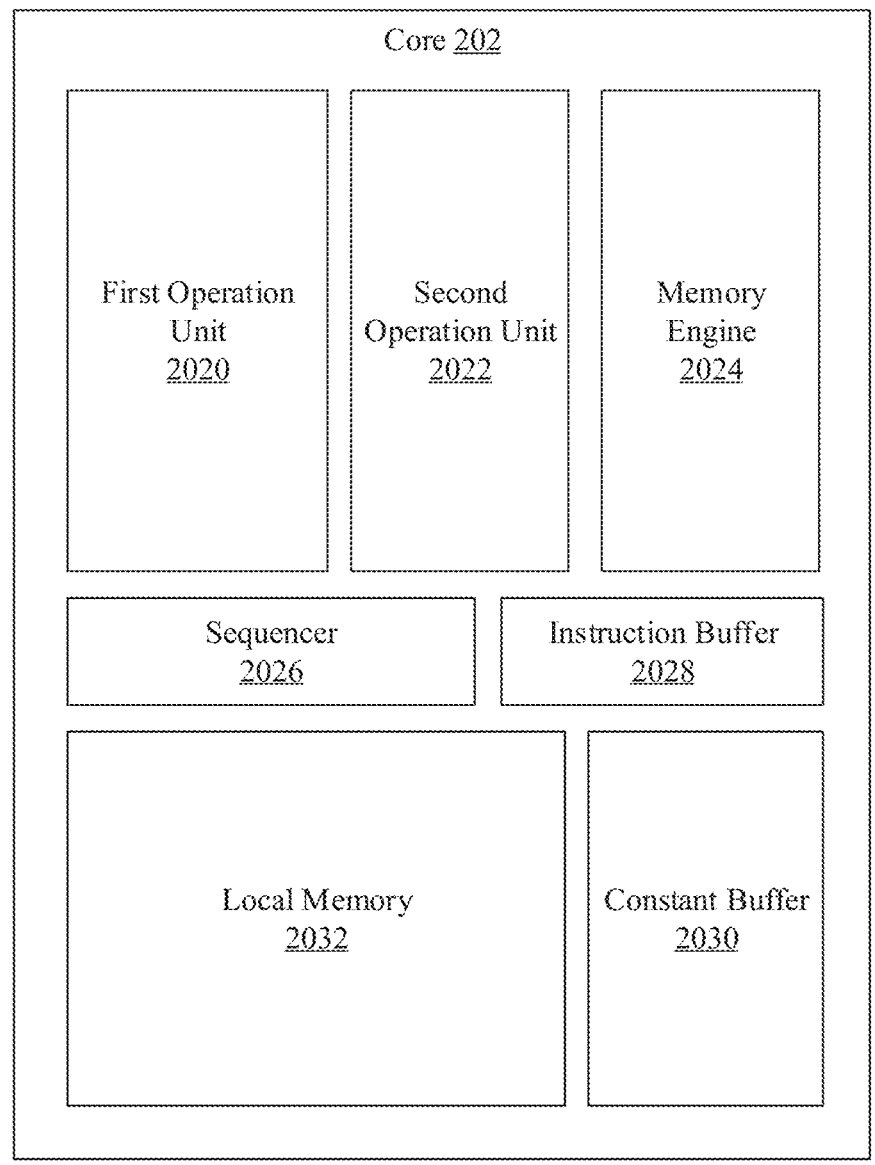
FIG. 2B illustrates a schematic representation of an example configuration of a core of a neural network accelerator, consistent with some embodiments of this disclosure.
Figure 2C:
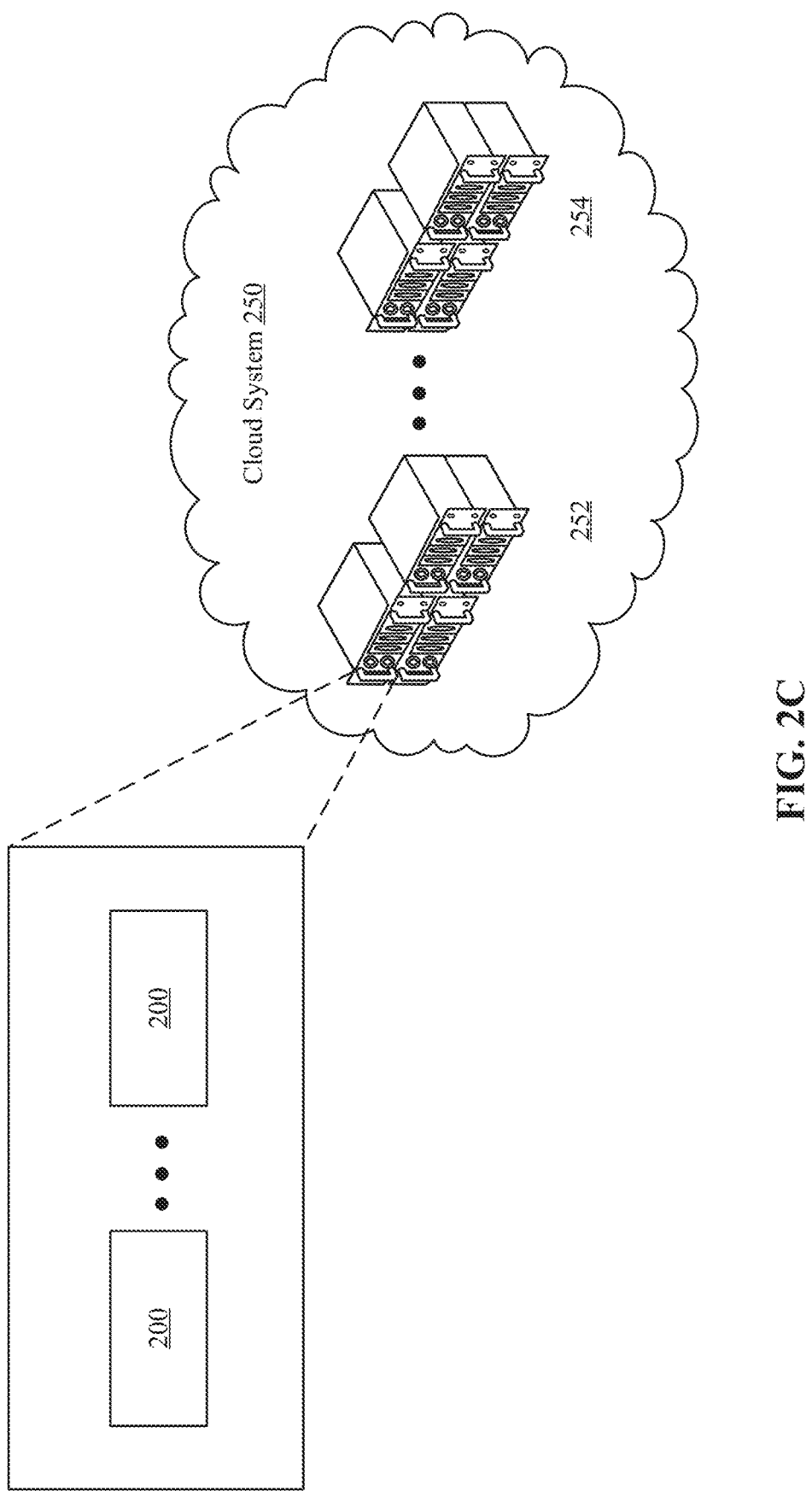
FIG. 2C illustrates a schematic representation of an example cloud system that includes a neural network accelerator, consistent with some embodiments of this disclosure.

By way of example, FIGS. 2A-2C depict a neural network accelerator for executing a neural network model (e.g., neural network 100A in FIG. 1A). FIG. 2A illustrates an example configuration of neural network accelerator 200, consistent with some embodiments of this disclosure. In the context of this disclosure, a neural network accelerator can also be referred to as a machine learning accelerator or deep learning accelerator. In some embodiments, neural network accelerator 200 can be referred to as an NPU architecture 200. In some embodiments, neural network accelerator 200 can be an HAPU architecture. It should be noted that neural network accelerator 200 can be utilized in various neural networks (e.g., a CNN, a DNN, an RNN, or any other neural network). In addition, some embodiments can be configured for various processing architectures, such as an NPU, a GPU, an FPGA, a TPU, an ASIC, an HAPU, or any processing architecture that is capable of processing data.

As shown in FIG. 2A, neural network accelerator 200 can include one or more cores 202, a command processor 204, a direct memory access (DMA) unit 208, a Joint Test Action Group (JTAG)/Test Access End (TAP) controller 210, a peripheral interface 212, and a bus 214. In some embodiments, neural network accelerator 200 can include one or more other components or elements (not shown in FIG. 2A). Although FIG. 2A shows four cores 202, it should be understood that neural network accelerator 200 can include a single core or any number of cores. As shown in FIG. 2A, Neural network accelerator 200 can interact with at least one of host unit 220 and host memory 221 that are outside thereof.

Cores 202 can perform algorithmic operations based on communicated data. Cores 202 can include one or more operation units for performing one or more operations (e.g., multiplication, addition, multiply-accumulate, or any number of any mathematical or algorithmic operations) based on a command (e.g., as a data packet) received from command processor 204. Command processor 204 can be communicatively coupled with one or more of cores 202 (e.g., as indicated by the dotted lines between command processor 204 and two of cores 202 in FIG. 2A). Each operation unit can include any number of processing units. For example, an operation unit can be of a single instruction, multiple data (SIMD) architecture that includes one or more processing units. To perform the operation on the communicated data, cores 202 can include an operation unit for processing information in the communicated data (e.g., in a form of data packets). In some embodiments, cores 202 can be communicatively coupled with each other (as indicated by the solid lines connecting each core in FIG. 2A). For example, cores 202 can be connected with a one-directional ring bus, which can support efficient pipelining for large neural network models. The architecture of cores 202 will be explained in detail associated with FIG. 2B.

Command processor 204 can interact with host unit 220 and host memory 221 to pass a command or data to one or more of core 202. For example, command processor 204 can receive the command from host unit 220 and receive the data from host memory 221. In another example, host unit 220 can store the command or data in host memory 221, and command processor 204 can receive the command and data from host memory 221. In some embodiments, command processor 204 can interact with host unit 220 under the supervision of a kernel mode driver (KMD). In some embodiments, command processor 204 can modify the command received from host unit 220 before sending it to cores 202, so that the command can enable cores 202 to work in parallel. For example, the modified command can be stored in an instruction buffer (e.g., instruction buffer 2028 in FIG. 2B or an instruction buffer outside cores 202). The instruction buffer can be integrated within or communicatively coupled to command processor 204 or a core (e.g., one of cores 202). In some embodiments, command processor 204 can coordinate one or more of cores 202 for parallel execution.

DMA unit 208 can assist with transferring data between host memory 221 and neural network accelerator 200. For example, DMA unit 208 can assist with loading the data from host memory 221 into one or more local memories (e.g., local memory 2032 in FIG. 2B) of corresponding cores 202. In some embodiments, DMA unit 208 can also assist with transferring data between multiple neural network accelerators (including neural network accelerator 200). DMA unit 208 can allow an off-chip device (not shown in FIG. 2A) to access on-chip and off-chip memories without causing an interrupt in a related processing unit (e.g., host unit 220 or command processor 204). In some embodiments, DMA unit 208 can assist with transferring data between components of neural network accelerator 200. For example, DMA unit 208 can assist with transferring data between multiple cores 202 or within each core. In some embodiments, DMA unit 208 can generate memory addresses and initiate memory read or write cycles. Additionally or alternatively, DMA unit 208 can include a register (e.g., a hardware register) that can be written and read by one or more processors (e.g., command processor 204 or cores 202), such as a memory address register, a byte-count register, a control register, or any number of any type of registers. The register can specify any combination of at least one of a source of the data to be transferred, a destination of the data to be transferred, a direction of the transfer (e.g., reading from an input/output or I/O device, or writing to the I/O device), a size of the transfer data, a number of bytes to transfer in one burst, or any feature of memory controllers. In some embodiments, neural network accelerator 200 can include one or more additional DMA units (not shown in FIG. 2A), which can transfer data between multiple neural network accelerators to allow them to communicate directly without involving a host processing unit (e.g., host unit 220 or command processor 204).

JTAG/TAP controller 210 can specify a debug port that implements a serial communications interface (e.g., a JTAG interface) for low-overhead access to neural network accelerator 200 without requiring direct external access to a system address or a data bus. In some embodiments, JTAG/TAP controller 210 can include an on-chip test access interface (e.g., a TAP interface) that implements a protocol for accessing a set of test registers that present chip logic levels and device capabilities of various parts.

Peripheral interface 212 (e.g., a PCIe interface) can serve as an inter-chip bus for providing communication between neural network accelerator 200 and other devices (not shown in FIG. 2A). Bus 214 (e.g., an inter-integrated circuit or "I$^2$C" bus) can include at least one of an intra-chip bus or an inter-chip bus. The intra-chip bus can connect internal components, which can allow the internal components to be called for as a single unit by neural network accelerator 200. While not all components are connected to each other by the intra-chip bus, all components do have some connection to other components they need to communicate with. The inter-chip bus can connect neural network accelerator 200 with another device (not shown in FIG. 2A), such as an off-chip memory or a peripheral device. For example, bus 214 can provide high speed communication across cores 202 and can also connect cores 202 with other units (e.g., the off-chip memory or the peripheral device). In some embodiments, bus 214 can include only one or more intra-chip buses, while peripheral interface 212 can include only one or more inter-chip bus. In some embodiments, while peripheral interface 212 can include one or more inter-chip bus, bus 214 can also include an inter-chip bus in addition to one or more intra-chip buses.

Host unit 220 can communicate with neural network accelerator 200 and can include one or more processing units (e.g., an X86 CPU). As shown in FIG. 2A, host unit 220 can be communicatively coupled to host memory 221. Host memory 221 can store a large amount of data with slower access speed compared with an on-chip memory (e.g., a cache) integrated within host unit 220. In some embodiments, the data stored in host memory 221 can be transferred to neural network accelerator 200 to be used for executing neural network models. In some embodiments, host memory 221 can be an internal memory (e.g., a random-access memory or RAM) or an external memory (e.g., a host disk) associated with host unit 220. For example, host memory 221 can include a double data rate synchronous dynamic RAM ("DDR SDRAM"). In another example, host memory 221 can include a host disk for providing additional memory for host unit 220.

In some embodiments, a host system that includes host unit 220 and host memory 221 can include a compiler (not shown in FIG. 2A). The compiler can be a program or computer software that transforms computer codes written in a programming language into instructions for neural network accelerator 200 to create an executable program. For example, in machine learning applications, a compiler can perform a variety of operations, such as pre-processing, lexical analysis, parsing, semantic analysis, conversion of input programs to an intermediate representation, initialization of a neural network, code optimization, and code generation, or any combination thereof. In some embodiments, the compiler can compile a neural network to generate a static parameter (e.g., a connection among neurons or a weight of a neuron).

In some embodiments, the host system (not shown in FIG. 2A) including the compiler can push one or more commands to neural network accelerator 200. As described above, in some embodiments, these commands can be processed by command processor 204, temporarily stored in an instruction buffer (e.g., instruction buffer 2028 in FIG. 2B) of neural network accelerator 200, and distributed to one or more of cores 202 or other processing elements (e.g., DMA unit 208, JTAG/TAP controller 210, peripheral interface 212, or bus 214). For example, some of the commands can instruct DMA unit 208 to load instructions or data from host memory 221 into neural network accelerator 200. The loaded instructions can then be distributed to one or more of cores 202 for processing.

In some embodiments, the first few instructions received by a core (e.g., one of cores 202) can instruct it to load or store data from host memory 221 into its local memory. The core can then initiate an instruction pipeline for fetching an instruction (e.g., via sequencer 2026 in FIG. 2B) from an instruction buffer (e.g., instruction buffer 2028 in FIG. 2B), decoding the instruction (e.g., via DMA unit 208), generating one or more local memory addresses (e.g., corresponding to an operand), reading source data, performing executing, loading, or storing operations, and then writing results back (e.g., to host memory 221 via DMA unit 208).

In some embodiments, neural network accelerator 200 can further include a global memory (not shown in FIG. 2A) that includes one or more memory blocks (e.g., four blocks of 8 GB second generation of high bandwidth memory or "HBM2") to serve as a main memory. In some embodiments, the global memory can fetch and store instructions and data from host memory 221 via DMA unit 208. The instructions can then be distributed to an instruction buffer associated with a core (e.g., one of cores 202) assigned with a corresponding task, and the core can process these instructions accordingly.

In some embodiments, neural network accelerator 200 can further include a memory controller (not shown in FIG. 2A) for managing reading and writing of data to and from a memory block (e.g., an HBM2) within the global memory. For example, the memory controller can manage reading or writing data from cores 202 (e.g., from local memory 2032 in FIG. 2B) or from a core of another accelerator (e.g., via DMA unit 208 or a DMA unit of the other accelerator). In some embodiments, neural network accelerator 200 can include multiple memory controllers. For example, each memory block (e.g., HBM2) within the global memory can include a corresponding memory controller.

In some embodiments, the memory controller can generate a memory address and initiate a memory reading or writing cycle. The memory controller can contain a register (e.g., a hardware register) that can be written and read by neural network accelerator 200. The registers can include a memory address register, a byte-count register, a control register, or any number of any other type of registers. The register can specify any combination of at least one of a source of the data to be transferred, a destination of the data to be transferred, a direction of the transfer (e.g., reading from an input/output or I/O device, or writing to the I/O device), a size of the transfer data, a number of bytes to transfer in one burst, or any feature of memory controllers.

It should be noted that neural network accelerator 200 can be deployed to computing devices in other forms, not limited to the examples described in this disclosure. Additionally, or alternatively, in some embodiments, neural network accelerator 200 can also provide ability to perform parallel computation.

By way of example, FIG. 2B illustrates a schematic representation of an example configuration of a core 202 of a neural network accelerator (e.g., neural network accelerator 200 of FIG. 2A), consistent with some embodiments of this disclosure. As shown in FIG. 2B, core 202 can include one or more operation units (including first and second operation units 2020 and 2022), a memory engine 2024, a sequencer 2026, an instruction buffer 2028, a constant buffer 2030, and a local memory 2032. In some embodiments, core 202 can include one or more other components or elements (not shown in FIG. 2B).

First and second operation units 2020 and 2022 can perform the same or different operations. In some embodiments, first operation unit 2020 can include one or more processing units for performing one or more operations (e.g., multiplication, addition, MAC, matrix-element-wise operation, matrix-element-wise operation, or any number of any mathematical or algorithmic operations) on received data (e.g., a matrix). In some embodiments, first operation unit 2020 can accelerate execution of convolution operations or matrix multiplication operations. In some embodiments, second operation unit 2022 can perform a pooling operation, an interpolation operation, a region-of-interest (ROI) identification operation, or any number of any mathematical or algorithmic operations. In some embodiments, second operation unit 2022 can include an interpolation unit, a pooling data path, or any circuit for performing any mathematical or algorithmic operation.

Memory engine 2024 can copy data within core 202 or between two cores (e.g., any two of cores 202 in FIG. 2A). In some embodiments, a DMA unit (e.g., DMA unit 208 in FIG. 2A) can assist with the data copying. For example, the DMA unit can assist memory engine 2024 to copy data from local memory 2032 into an operation unit (e.g., first operation unit 2020 or second operation unit 2022). In some embodiments, matrix transposition can also be performed in memory engine 2024 to make the matrix suitable to be used in the operation unit.

Sequencer 2026 can be communicatively coupled to instruction buffer 2028 for receiving and distributing commands to components of core 202. For example, sequencer 2026 can distribute a convolution command or a multiplication command to first operation unit 2020, distribute a pooling command to second operation unit 2022, and distribute a data-copy command to memory engine 2024. In some embodiments, sequencer 2026 can monitor execution of a neural network task and parallelize sub-tasks of the neural network task to improve execution efficiency. In some embodiments, first operation unit 2020, second operation unit 2022, and memory engine 2024 can run in parallel under control of sequencer 2026 according to instructions stored in instruction buffer 2028.

Instruction buffer 2028 can store one or more instructions associated with core 202. In some embodiments, instruction buffer 2028 is communicatively coupled to sequencer 2026 for providing instructions thereto. In some embodiments, instructions stored in instruction buffer 2028 can be transferred or modified by a command processor (e.g., command processor 204 in FIG. 2A).

Constant buffer 2030 can store one or more constant values. In some embodiments, constant values stored in constant buffer 2030 can be used by an operation unit (e.g., first operation unit 2020 or second operation unit 2022) for batch normalization, quantization, de-quantization, or any mathematical or algorithmic operation.

Local memory 2032 can provide storage space for boosting reading/writing speed. In some embodiments, local memory 2032 can have a large storage space (e.g., at least 192 MB) for reducing interactions with a global memory (not shown in FIG. 2B). With the large storage space, most of data access can be performed within core 202 to reduce latency. In some embodiments, to minimize data loading latency and energy consumption, local memory 2032 can integrate an on-chip static random access memory (SRAM). In some embodiments, local memory 2032 be evenly distributed on core 202 to mitigate dense wiring and heating issues.

The neural network accelerator disclosed herein (e.g., neural network accelerator 200 in FIG. 2A) can be integrated in a computing device (e.g., a smart phone, a tablet, a wearable device, or a computing server). By way of example, FIG. 2C illustrates a schematic representation of an example cloud system 250 that includes a neural network accelerator, consistent with some embodiments of this disclosure. As shown in FIG. 2C, cloud system 250 can provide a cloud service with artificial intelligence (AI) capabilities and can include one or more computing servers (including computing servers 252 and 254). In some embodiments, a computing server 252 can incorporate one or more neural network accelerators (e.g., neural network accelerator 200 of FIG. 2A). For simplicity and clarity, neural network accelerator 200 is shown in FIG. 2C in a simplified manner. With the assistance of neural network accelerator 200, cloud system 250 can provide the AI capabilities of, for example, image recognition, facial recognition, translations, 3D modeling, or any task that can simulate or correspond to high-level human-intelligence actions.

Aspects of this disclosure can relate to programmable truncated multiplication, including systems, apparatuses, methods, and non-transitory computer-readable media. For ease of description, a method is described below in associated with truncated multiplication circuitry, with the understanding that aspects to the method and truncated multiplication circuitry apply equally to systems, apparatuses, and non-transitory computer-readable media. For example, some aspects of such a method or truncated multiplication circuitry can be implemented by a system, an apparatus, or as program codes or computer instructions stored in a non-transitory computer-readable medium. In a broadest sense, the method and truncated multiplication circuitry is not limited to any particular physical or electronic instrumentalities, but rather can be accomplished using many different instrumentalities. By way of example, one or more components (e.g., host unit 220, command processor 204, first operation unit 2020, or second operation unit 2022) in FIGS. 2A-2C can include the truncated multiplication circuitry (e.g., implemented as a MUL or a MAC).

Truncated multiplication, as used herein, can include any operation of disabling or skipping computation of some steps of the multiplication to generate an output of the multiplication. The truncated multiplication circuitry, as used herein, can include any logic circuitry (e.g., a MUL or a MAC) that can perform programmable truncated multiplication. Programmable truncated multiplication, as used herein, can include any operation of dynamically selecting steps of the multiplication to disable or skip for disabling or skipping such selected steps to generate an output of the multiplication.

Consistent with some embodiments of this disclosure, the truncated multiplication circuitry can also include a control register. The control register can include a first section configured to store a first value representing truncating a most significant bit (MSB) of a partial product of a multiplier and a multiplicand, and a second section configured to store a value representing a truncation mode. The register, as used herein, can refer to a component inside a logic circuitry (e.g., the truncated multiplication circuitry) that stores data (e.g., a condition, a flag, or temporary information) accessible by a logic operation unit of the logic circuitry. A section of a register, as used herein, can refer to a portion of the register, which can include one or more consecutive or non-consecutive bits for storing values (e.g., a binary value). The register can include one or more sections, and each section can include one or more bits. Each bit of the register can be associated with an address (e.g., a memory address) to allow it being located and accessed. For example, the control register can include 32 bits assigned with addresses 0 through 31.

A value stored in the control register, as used herein, can refer to any data (e.g., binary data) for configuring or controlling the truncated multiplication circuitry for programmable truncated multiplication or compensation. The value can take one or more bits to be stored in the register. For example, the truncated multiplication circuitry can access a section in the control register and perform a corresponding operation depending on a value read from the section. The truncation mode, as used herein, can refer to a scheme or a manner for the truncated multiplication circuitry to performing truncated multiplication.

The partial product, as used herein, can refer to an incomplete result of performing a multiplication. For example, the partial product can include one or more products between the multiplier and one or more bits (but less than all) of the multiplicand, or a sum thereof. In some embodiments, the multiplier and the multiplicand can be signed. By way of example, the multiplier can be multiplier 162 in FIG. 1B, signed multiplier 184 or signed multiplier 194 in FIG. 1C. The multiplicand can be multiplicand 164, signed multiplicand 186 or signed multiplicand 195 in FIG. 1C. As another example, the partial product can be any row of partial product matrix 100B in in FIG. 1B, any row of partial product matrix 188 or any row of partial product matrix 196 in FIG. 1C. By way of example, the truncation column register can be included in host unit 220, command processor 204, first operation unit 2020, or second operation unit 2022 in FIGS. 2A-2B.

Figures 3, 4:
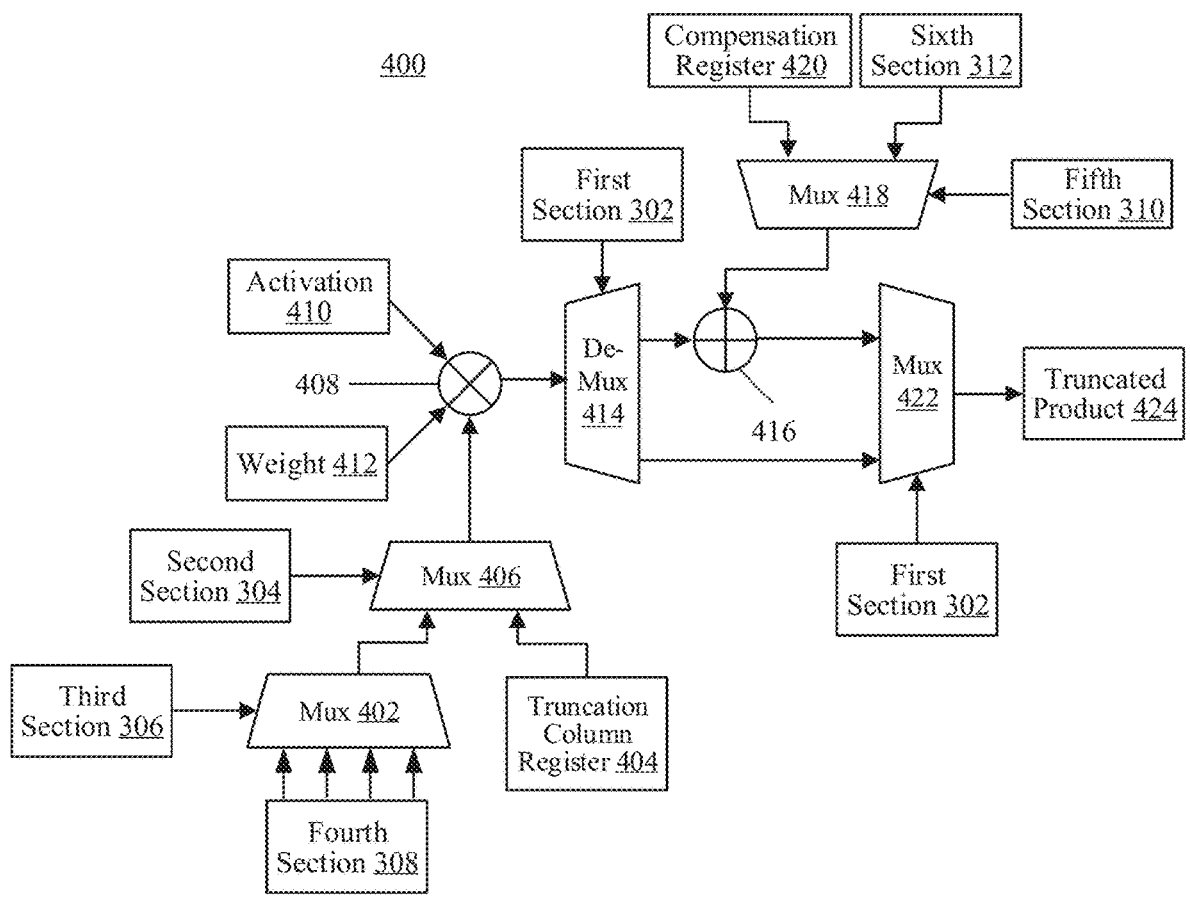
FIG. 3 illustrates a schematic representation of an example control register, consistent with some embodiments of this disclosure.
FIG. 4 illustrates a flowchart of example circuitry for truncated multiplication, consistent with some embodiments of this disclosure.

By way of example, FIG. 3 illustrates a schematic representation of an example control register 300, consistent with some embodiments of this disclosure. For example, control register 300 can be included in host unit 220, command processor 204, first operation unit 2020, or second operation unit 2022 in FIGS. 2A-2B. As illustrated in FIG. 3, control register 300 can include multiple sections, including a first section 302, a second section 304, a third section 306, a fourth section 308, a fifth section 310, and a sixth section 312. Control register 300 can have a bit width of 32, 64, or any number. Each section of control register 300 can include one or more bits for storing one or more values. It should be noted that control register 300 can include more or fewer sections than those illustrated in FIG. 3. It should also be noted that each section in control register 300 can be rearranged in any order without affecting their functions.

In some embodiments, first section 302 can store a first value representing truncating an MSB of a partial product of a multiplier and a multiplicand. First section 302 can include one bit that stores a value "1" or "0." For example, the value "1" can represent enabling truncating one or more MSBs of the partial product. The value "0" can represent enabling truncating one or more least significant bits (LSBs) of the partial product. The values of the bit and their corresponding representations can be different. In some embodiments, first section 302 can include two or more bits that can store two or more values. For example, first section 302 can include two bits that can store values "00" (i.e., equivalent to "0"), "01" (i.e., equivalent to "1"), "10," and "11." The value "10" can represent enabling truncating both the MSB and the LSB of the partial product. The value "11" can represent disabling truncation (i.e., truncating neither the MSP nor the LSP). It should be noted that first section 302 can include any number of bits configured to store any values to indicate enabling or disabling truncating any combination of any number of MSBs or LSBs of the partial product.

Consistent with some embodiments of this disclosure, the truncated multiplication circuitry can further include control circuitry configured to truncate the MSB of the partial product based on the truncation mode if the first section stores the first value. The control circuitry, as used herein, can include a logic unit or a processor for controlling truncated multiplication. For example, the control circuitry can be an arithmetic logic unit that can enable or disable one or more bits of a partial product of a multiplication operation based on input control bits (control bits $t_j$ in FIG. 1B).

By way of example, in FIG. 3, second section 304 can store a value representing a truncation mode. In some embodiments, the second section can store a value representing a first truncation mode or a value representing a second truncation mode. The control circuitry can truncate a first-mode length of MSBs of the partial product if the second section stores the value representing the first truncation mode. The control circuitry can truncate a second-mode length of MSBs of the partial product if the second section stores the value representing the second truncation mode. The first-mode length (or second-mode length), as used herein, can refer to a length of bits to be truncated under the first truncation mode (or the second truncation mode). The first-mode length and the second-mode length can include one or more bits.

In some embodiments, the first mode can be a "batch mode" or a "coarse mode" where the first-mode length can be selected from one or more preset lengths. For example, in the first truncation mode, the control circuitry can truncate 2 bits, 4 bits, 8 bits, or any preset length of bits from the partial product. In some embodiments, the second mode can be an "individual mode" or a "fine mode" where the second-mode length can be determined based on specific characteristics of the multiplier and the multiplicand. For example, in the second truncation mode, the truncated multiplication circuitry can determine the second-mode length (e.g., 3 bits, 7 bits, or 14 bits) based on how many leading bits of the multiplier (or the multiplicand) have the same value (e.g., all "0" or all "1"). The first and second truncation modes will be detailed in later description.

Consistent with some embodiments of this disclosure, the truncated multiplication circuitry can further include detection circuitry configured to determine the first-mode length or the second-mode length. In such a case, the control register can further include a third section configured to store a value representing enabling the detection circuitry to determine the first-mode length or the second-mode length. The detection circuitry, as used herein, can include a logic unit or a processor for determining the number of bits to be truncated in truncated multiplication.

For example, the truncated multiplication circuitry can access the third section and read a value therefrom. If the value is "1," the truncated multiplication circuitry can enable the detection circuitry to determine the first-mode length or the second-mode length. If the value is "0," the truncated multiplication circuitry can disable the detection circuitry and receive the first-mode value or the second-mode value from an external source. The external source (e.g., an external register) can be any circuitry that is communicatively coupled to the truncated multiplication circuitry but is not integrated with the truncated multiplication circuitry. By way of example, in FIG. 3, third section 306 can store a value representing enabling the detection circuitry to determine the first-mode length or the second-mode length.

In some embodiments, the third section stores a value (e.g., "1") that represents enabling the detection circuitry to determine the first-mode length or the second-mode length, and the second section stores the value representing the first truncation mode. To determine the first-mode length, the detection circuitry can determine whether values of a first preset length (e.g., 24 bits) of MSBs of the multiplier are the same (e.g., all being "0" or all being "1") and whether values of the first preset length (e.g., 24 bits) of MSBs of the multiplicand are the same (e.g., all being "0" or all being "1"). If the values of the first preset length of MSBs of the multiplier are the same and the values of the first preset length of MSBs of the multiplicand are the same, the detection circuitry can determine the first-mode length based on the first preset length. If the values of the first preset length of MSBs of the multiplier are not the same or the values of the first preset length of MSBs of the multiplicand are not the same, the detection circuitry can determine whether the values of a second preset length (e.g., 16 bits) of MSBs of the multiplier are the same and whether the values of the second preset length (e.g., 16 bits) of MSBs of the multiplicand are the same. The second preset length can be shorter than the first preset length. As long as the values of the second preset length of MSBs of the multiplier are not the same or the values of the second preset length of MSBs of the multiplicand are not the same, the detection circuitry can repeat the above procedures using a third length shorter than the second length, until finding a preset length that the values of the preset length of MSBs of the multiplier are the same and the values of the preset length of MSBs of the multiplicand are the same.

Consistent with some embodiments of this disclosure, the control register can further include a fourth section configured to store a value representing the first preset length and a value representing the second preset length. By way of example, in FIG. 3, fourth section 308 can store a value representing the first preset length (e.g., 24 bits) and a value representing the second preset length (e.g., 16 bits). For example, fourth section 308 can include 2 bits that can store four values "00," "01," "10," and "11" representing four preset lengths 24 bits, 16 bits, 8 bits, and 4 bits, respectively. When the detection circuitry detect the first-mode length using the above-described procedures, it can attempt to use the four preset lengths one at a time, from the longest one (e.g., 24 bits) to the shortest one (e.g., 4 bits). By doing so, the detection circuitry can determine the largest possible preset lengths of MSBs having the same value for both the multiplier and the multiplicand. By using preset lengths, the detection speed can be boosted, and the power consumption can be reduced. It should be noted that other preset lengths can be set in fourth section 308, not limited to the examples described herein. It should also be noted that fourth section 308 can include more than 2 bits, not limited to the examples described herein, which can be used to represent more preset lengths.

By way of example, the multiplier and the multiplicand can be represented in Two's Completion format. The multiplier and the multiplicand can be signed multiplier 194 and signed multiplicand 195 in FIG. 1C, respectively. The detection circuitry of the truncated multiplication circuitry can detect whether a first preset length (e.g., 6 bits) of MSBs of signed multiplier 194 are the same and whether the first preset length (e.g., 6 bits) of MSBs of signed multiplier 195 are the same. As shown in FIG. 1C, the first 6 bits of MSBs of signed multiplier 194 are "111110" that are not the same, and the first 6 bits of MSBs of signed multiplier 195 are "111110" that are not the same. In such a case, the detection circuitry can further determine whether a second preset length (e.g., 4 bits) of MSBs of signed multiplier 194 are the same and whether the second preset length (e.g., 4 bits) of MSBs of signed multiplier 195 are the same. As shown in FIG. 1C, the first 4 bits of MSBs of signed multiplier 194 are "1111" that are the same, and the first 4 bits of MSBs of signed multiplier 195 are "1111" that are the same. The detection circuitry can then determine the first-mode length based on the second preset length (i.e., 4).

In some embodiments, after determining the second preset length, the detection circuitry can determine the first-mode length as follows. Generally, a multiplication of an N-bit multiplier (N being an integer) and an M-bit multiplicand (M being an integer) yield a full-precision product of (N+M−1) or (N+M) bits. If both of the N-bit multiplier and the M-bit multiplicand have a length L (L<N, M) of MSBs that have the same value (e.g., "0" or "1"), then (2L+1) MSBs can be truncated from the full-precision product without affecting the value of the correct result. In such a case, the detection circuitry can determine the first-mode length as (2L+1).

By way of example, as illustrated in FIG. 1C, a multiplication of 8-bit signed multiplier 194 and 8-bit signed multiplicand 195 yields a 16-bit, full-precision, signed product 197 (overflow bit 198 being discarded). Because the detection circuitry determines that the second preset length (i.e., 4) of MSBs of both signed multiplier 194 and signed multiplicand 195 are the same (i.e., "1"), nine (i.e., 2×4+1) MSBs of signed product 197 can be truncated, and the remaining result (i.e., "0011110") is still correct. In such a case, the detection circuitry can determine the first-mode length as nine bits. When the control circuitry truncates a first-mode length (e.g., nine) of MSBs of a partial product (e.g., any row in partial product matrix 196 in FIG. 1C) of signed multiplier 194 and signed multiplicand 195, the control circuitry can skip or disable switching states of circuitry elements (e.g., transistors) corresponding to bit positions falling into the truncated MSBs, such as the bit positions inside MSP 199 in FIG. 1C.

In some embodiments, the third section stores a value (e.g., "1") that represents enabling the detection circuitry to determine the first-mode length or the second-mode length, and the second section stores the value representing the second truncation mode. To determine the second-mode length, the detection circuitry can determine a first length of all MSBs having the same value in the multiplier and a second length of all MSBs having the same value in the multiplicand, and determine the second-mode length based on the first length and the second length. In such a case, the detection circuitry detects all possible MSBs that have the same value for the multiplier and the multiplicand without using any preset length. By doing so, the detection circuitry can determine the largest possible lengths of MSBs having the same value for both the multiplier and the multiplicand. As a result, the second-mode length can be longer than the first-mode length, which can allow the control circuitry to truncate more bits for power saving.

In some embodiments, the detection circuitry can determine the second-mode length as follows. As described above, an N-bit multiplier (N being an integer) and an M-bit multiplicand (M being an integer) can yield a full-precision product of (N+M−1) or (N+M) bits. If of N-bit multiplier has a length L1 (L1<N) of MSBs that have the same value (e.g., "0" or "1"), and the M-bit multiplicand has a length L2 (L2<M) of MSBs that have the same value (e.g., "0" or "1"), assuming L1<L2, then (2L1+1) MSBs can be truncated from the full-precision product without affecting the value of the correct result. In such a case, the detection circuitry can determine the second-mode length as (2L1+1).

By way of example, as illustrated in FIG. 1C, the detection circuitry can determine that 5 MSBs of signed multiplier 194 are the same (i.e., "1"), and 5 MSBs of signed multiplier 195 are the same (i.e., "1"). In such a case, eleven (i.e., 2×5+1) MSBs of signed product 197 can be truncated, and the remaining result (i.e., "11110") is still correct. In such a case, the detection circuitry can determine the second-mode length as eleven bits. When the control circuitry truncates a second-mode length (e.g., eleven) of MSBs of a partial product (e.g., any row in partial product matrix 196 in FIG. 1C) of signed multiplier 194 and signed multiplicand 195, the control circuitry can skip or disable switching states of circuitry elements (e.g., transistors) corresponding to bit positions falling into the truncated MSBs. Compared with the case where the first-mode length (e.g., nine) of MSBs are truncated from the partial product, the second-mode length determined without using preset lengths allows the control circuitry to truncate more MSBs (e.g., 2 more bits), which can further reduce power consumption in the truncated multiplication circuitry.

In some embodiments, the third section can store a value (e.g., "0") that represents disabling the detection circuitry to determine the first-mode length or the second-mode length. In such a case (referred to as "software truncation"), the truncated multiplication circuitry can receive the first-mode length or the second-mode length from an external source (e.g., an external register).

Consistent with some embodiments of this disclosure, the truncated multiplication circuitry can further include a truncation column register configured to store a value representing a position of the MSB in the partial product. For example, the truncation column register can include 32 bits assigned with addresses 0 through 31. In some embodiments, the truncated multiplication circuitry can determine one or more values representing one or more positions of MSBs that are to be truncated and store it to the truncation column register based on the above-described first-mode length or second-mode length. For example, if the truncated multiplication circuitry has a bit width of 16 bits and works in the first truncation mode (e.g., because the second section stores a value representing the first truncation mode), and if the first-mode length is determined to be nine, then the truncated multiplication circuitry can determine a 16-bit value of "0000000001111111" (with nine leading zeros) and store it to the column register. In another example, if the truncated multiplication circuitry works in the second truncation mode (e.g., because the second section stores a value representing the second truncation mode), and if the second-mode length is determined to be eleven, then the truncated multiplication circuitry can determine a 16-bit value of "0000000000011111" (with eleven leading zeros) and store it to the column register. The value stored in the truncation column register can be used as control bits for controlling truncation of the truncated multiplication circuitry. For example, a value of "0000000001111111" (with nine leading zeros) can be used by the control circuitry to truncate nine MSBs of the partial product of the multiplier and multiplicand. By way of example, the value stored in the truncation column register can represent control bits $t_j$ in FIG. 1B.

Consistent with some embodiments of this disclosure, the first section of the truncated multiplication circuitry can further be configured to store at least one of a second value representing truncating a least significant bit (LSB) of the partial product or a third value representing truncating the MSB and the LSB of the partial product. In such a case, the control circuitry of the truncated multiplication circuitry can be further configured to truncate the LSB of the partial product based on the truncation mode if the first section stores the second value, or truncate the MSB and the LSB of the partial product based on the truncation mode if the first section stores the third value. In some embodiments, the truncation column register can store a value representing a position of the LSB in the partial product. For example, the first section can have 2 bits to store "00," "01," "10," and "11." The first value "00" can represent that the truncated multiplication is to be performed on one or more MSBs of the partial product. The second value "01" can represent that the truncated multiplication is to be performed on one or more LSBs of the partial product. The third value "10" (or "11") can represent that the truncated multiplication is to be performed on both at least one MSB and at least one LSB of the partial product. In some embodiments, the first section can store a fourth value "11" (or "10") that can represent that no truncation is to be performed (i.e., the product of the multiplier and the multiplicand will have a full precision).

The control circuitry can truncate the LSBs of the partial product dynamically. By way of example, the truncation column register can receive and store a value to be used by the control circuitry to truncate at least one of the MSBs or the LSBs. By way of example, as illustrated in FIG. 1B, the truncation column register can store a value (e.g., "1111111111000000" or "0000000001110000") that represents control bits (e.g., control bits $t_j$ in FIG. 1B), and the control circuitry can read the value stored in the truncation column to truncate one or more LSBs (e.g., LSP 172 or LSPminor 176 in FIG. 1B). The value stored in the truncation column register can be programmable (e.g., either received from an external source or determined based on the first-mode length or second-mode length by the detection circuitry), which can allow dynamic truncation of the MSBs, LSBs, or both, or disable truncation entirely. By doing so, the truncated multiplication circuitry can achieve great flexibility for various applications that have different requirements on the tradeoff between result precision and power consumption.

For example, the truncated multiplication circuitry can be used for executing a neural network model (e.g., for training or inference). When some parameters of the neural network have small values or have lower bit width than the truncated multiplication circuitry, the truncated multiplication circuitry can enable truncating one or more MSBs of partial products to reduce power consumption without compromising result precision. When some parameters of the neural network model have high requirement on precision, the truncated multiplication circuitry can disable truncated multiplication. When some parameters of the neural network model have high computation complexity by low requirement on precision, or when power savings have higher priority than result precision, the truncated multiplication circuitry can enable truncating one or more LSBs of the partial products to trade a certain result precision for a certain power savings. Such dynamic truncation can be implemented at run time of the truncated multiplication circuitry for any stage of executing the neural network model.

Consistent with some embodiments of this disclosure, the control register can further include a fifth section configured to store a value representing a compensation mode. The compensation mode, as used herein, can refer to a manner by which the truncated multiplication circuitry compensates a truncated product by adding a compensation value to it such that a variance and a mean of truncation-induced error can be reduced. For example, the compensation can be operation-level compensation or system-level compensation. A truncated product, as used herein, can refer to a final product of the truncated multiplication (e.g., by truncating an MSB of partial product, an LSB of the partial product, or both) between the multiplier and the multiplicand.

By way of example, in FIG. 3, fifth section 310 can store a value representing a compensation mode. As an example, the truncated product can include full-precision product 166 having truncated bits 178 as "0" (i.e., truncated bits 178 being LSBs), or signed product 197 having one or more MSBs truncated.

In some embodiments, the fifth section can store a value representing hardware compensation, and the control register can further include a sixth section configured to store a value representing a hardware compensation scheme. In such a case, the truncated multiplication circuitry can further include compensation circuitry configured to generate a compensation value based on the hardware compensation scheme. The hardware compensation, as used herein, can refer to compensation implemented as hardware (e.g., using specific-purpose circuitry). The hardware compensation scheme, as used herein, can refer to an algorithm, a method, a mode, a manner, or any procedure for compensating the truncated product, which can be implemented as hardware (e.g., logic circuitry or a dedicated chip unit) or firmware (e.g., storing instructions or program codes to be executed). The compensation circuitry, as used herein, can include a logic unit or a processor for determining the compensation value. For example, the compensation circuitry can be an adder circuitry. The compensation value can be a value to be added to the truncated product for compensating a truncation-induced error.

By way of example, in FIG. 3, sixth section 312 can store a value representing a hardware compensation scheme. In some embodiments, sixth section 312 can include multiple bits for storing multiple values representing multiple hardware compensation schemes.

In some embodiments, the fifth section can store a value representing software compensation, and the control circuitry can be further configured to receive a compensation value from an external source (e.g., an external register). The software compensation, as used herein, can refer to compensation implemented as software (e.g., no specific-purpose circuitry being used). For example, the software compensation scheme can include adding a constant value to the truncated product, adding an estimated bias determined based on a statistic analysis of partial products of the truncated product, or adding a value determined in a symmetric scheme for minimizing the mean square error of the partial products.

In some embodiments, the fifth section can store a value representing disabling compensation. In such a case, the truncated multiplication circuitry does not add any value to the truncated product.

In some embodiments, to implement the compensation, the control circuitry can be further configured to determine a truncated product of the multiplier and the multiplicand based on the partial product, and add the compensation value to the truncated product. Consistent with some embodiments of this disclosure, the truncated multiplication circuitry can further include a compensation register configured to store the compensation value. For example, the compensation register can have the same bit width with the truncation column register (e.g., 32 bits, 64 bits, or any length of bits).

Consistent with some embodiments of this disclosure, the control circuitry can be configured to execute a set of instructions in a reduced-instruction-set-computer-V (RISC-V) format. For example, the truncated multiplication circuitry can be included in a RISC-V processor.

By way of example, FIG. 4 illustrates a flowchart of example circuitry 400 for truncated multiplication, consistent with some embodiments of this disclosure. In some embodiments, circuitry 400 can include control register 300 in FIG. 3. As an example, circuitry 400 can truncate a length of MSBs of a partial product (e.g., a row in partial product matrix 196 in FIG. 1C) of a multiplier (e.g., signed multiplier 194 in FIG. 1C) and a multiplicand (e.g., signed multiplier 195 in FIG. 1C) in a truncation mode, and determine whether performing software compensation or hardware compensation to generate a truncated product of the multiplier and the multiplicand.

Circuitry 400 can receive, from third section 306, a value representing enabling circuitry 400 (e.g., detection circuitry thereof) to determine a first-mode length. Circuitry 400 can further receive, from fourth section 308, a set of values representing a set of preset lengths (e.g., 24, 16, 8, and 4), and input the values to a multiplexer ("mux") 402 (represented by multiple arrows between fourth section 308 and mux 402) for selection based on a priority order. The priority order is from the largest value to the smallest value of the values.

For example, circuitry 400 can determine (e.g., by the detection circuitry) whether a first preset length (e.g., 24) of MSBs of the multiplier are the same (e.g., being all "0" or "1") and whether values of the first preset length (e.g., 24) of MSBs of the multiplicand are the same. If so, circuitry 400 can determine the first-mode length based on the first preset length. For example, if the first preset length is 24, the first-mode length can be 49 (i.e., 24×2+1). If the values of the first preset length of MSBs of the multiplier are not the same (e.g., being a mix of "0" and "1") or the values of the first preset length of MSBs of the multiplicand are not the same, circuitry 400 can determine whether the values of a second preset length (e.g., 16) of MSBs of the multiplier are the same and whether the values of the second preset length of MSBs of the multiplicand are the same. If so, circuitry 400 can determine the first-mode length based on the second preset length. For example, if the second preset length is 16, the first-mode length can be 33 (i.e., 16×2+1). Circuitry 400 can repeat the above procedures until the first-mode length is determined. Mux 402 can output the first-mode length to a mux 406.

Circuitry 400 can further include a truncation column register 404 that stores a value representing a position of the MSB in the partial product. For example, truncation column register 404 can store control bits (control bits $t_j$ in FIG. 1B) for enabling or disabling one or more bit positions of the partial product. In some embodiments, truncation column register 404 can store control bits determined (e.g., by the detection circuitry) based on the first-mode length. In some embodiments, the truncation column register 404 can control bits determined (e.g., by the detection circuitry) based on a second-mode length.

For example, to determine the second-mode length, circuitry 400 can receive, from third section 306, a value representing enabling circuitry 400 (e.g., the detection circuitry) to determine a second-mode length. Circuitry 400 can then determine a first length of all MSBs having the same value in the multiplier and a second length of all MSBs having the same value in the multiplicand, and determine the second-mode length based on the first length and the second length. For example, if the first length is 17 and the second length is 15, the second-mode length can be 31 (i.e., 15×2+1).

In some embodiments, to determine the control bits in the truncation column register 404, the truncation column register 404 can receive, from third section 306, a value representing disabling circuitry 400 (e.g., the detection circuitry) to determine the first-mode length or the second-mode length, and can further receive on or more control bits (e.g., for truncating LSBs of the partial product) from an external source (e.g., an external register, not shown in FIG. 4).

Mux 406 receives the first-mode length from mux 402, the control bits from truncation column register 404, and a value representing a truncation mode from second section 304. If the value received from second section 304 represents a first truncation mode, mux 406 can output control bits corresponding to the first-mode length of MSBs. If the value received from second section 304 represents a second truncation mode, mux 406 can output control bits corresponding to the second-mode length of MSB s. If truncation column register 404 receives and stores control bits from the external source, mux 406 can also output those control bits.

Mux 406 can output the control bits to a multiplier 408 (e.g., a MUL unit or a MAC unit) for performing truncated multiplication. Multiplier 408 can receive operands for the truncated multiplication, such as an activation 410 and a weight 412. For example, each of activation 410 and weight 412 can be a binary value associated with a neural network model. Multiplier 408 can truncate one or more partial products of the multiplier and multiplicand to determine an uncompensated truncated product. Multiplier 408 can output the uncompensated truncated product to a demultiplexer ("demux") 414.

Demux 414 can receive, from first section 302, a first value representing truncating an MSB of the partial product during the truncated multiplication of multiplier 408, a second value representing truncating an LSB of the partial product, or a third value representing truncating the MSB and the LSB of the partial product. Based on the value received from first section 302, demux 414 can determine a compensation mode. For example, demux can determine to not compensate the uncompensated truncated product based on the first value (e.g., because no LSB is truncated). In another example, demux can determine to compensate the uncompensated truncated product based on the second value or the third value (e.g., because LSB is truncated).

If demux 414 determines not to compensate the uncompensated truncated product, it can output the uncompensated truncated product directly to a mux 422. If demux 414 determines to compensate the uncompensated truncated product, it can output the uncompensated truncated product to an adder 416 that can add a compensation value to the uncompensated truncated product. Adder 416 can perform software compensation or hardware compensation.

For example, a mux 418 of circuitry 400 can receive a value representing a compensation mode from fifth section 310, a value representing a hardware compensation scheme from sixth section 312, and a software-based compensation value from a compensation register 420. If the compensation mode represents hardware compensation, circuitry 400 can generate (e.g., by compensation circuitry thereof) a hardware-based compensation value based on the hardware compensation scheme and output it to mux 418. If the compensation mode represents software compensation, circuitry 400 can output the software-based compensation value (e.g., received from an external source) from compensation register 420 to mux 418. Mux 418 can output the compensation value (e.g., software-based or hardware-based compensation value) to adder 416. Adder 416 can add the compensation value to the uncompensated truncated product and output a compensated truncated product to mux 422.

Mux 422 can receive, from first section 302, the first value, the second value, or the third value. Because mux 422 and demux 414 receives the same first, second, or third value from first section 302, mux 422 can make a decision to output either the uncompensated truncated product or the compensated truncated product corresponding to the decision made by demux 414 regarding whether to perform compensation. For example, if demux 414 determines not to compensate the uncompensated truncated product, mux 422 can determine to output the uncompensated truncated product directly received from demux 414 as a truncated product 424. If demux 414 determines to compensate the uncompensated truncated product, mux 422 can output the compensated truncated product received from adder 416 as truncated product 424.

In some embodiments, although not shown in FIG. 4, demux 414 can receive, from fifth section 310, the value representing the compensation mode. If the compensation mode represents hardware compensation or software compensation, demux 414 can output the uncompensated truncated product to adder 416. If the compensation mode represents disabling compensation, demux 414 can output the uncompensated truncated product directly to mux 422. Correspondingly, in those cases, although not shown in FIG. 4, mux 422 can also receive the value representing the compensation mode from fifth section 310, and make a decision to output either the uncompensated truncated product or the compensated truncated product corresponding to the decision made by demux 414 regarding whether to perform compensation.

Figure 5:
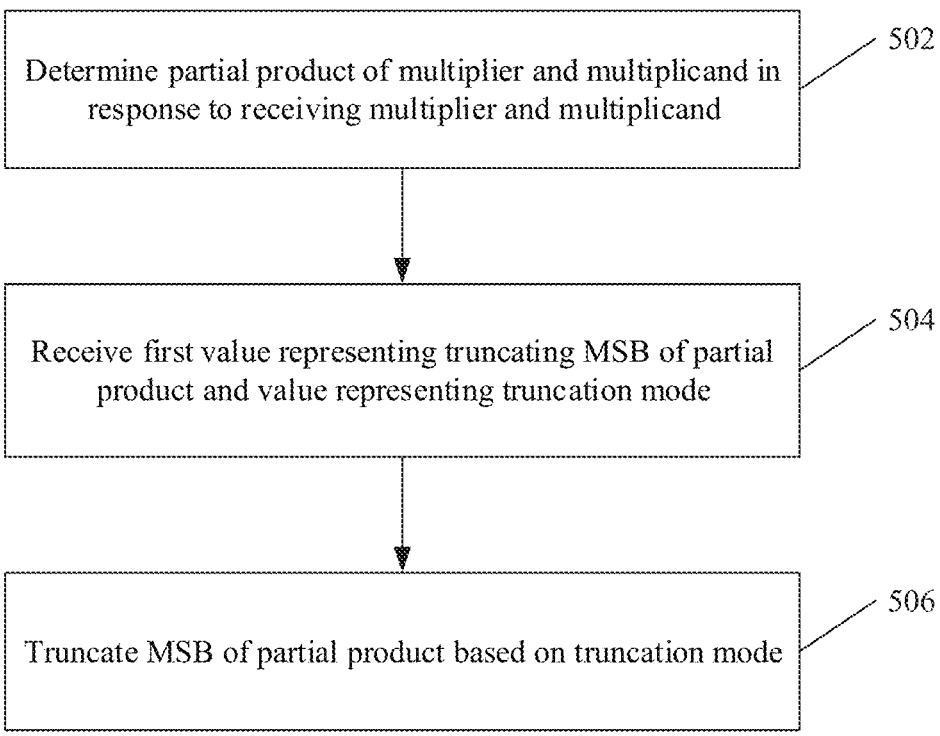
FIG. 5 illustrates a flowchart of an example method for truncated multiplication, consistent with some embodiments of this disclosure.

By way of example, FIG. 5 illustrates a flowchart of an example method 500 for truncated multiplication, consistent with some embodiments of this disclosure. Method 500 can be performed by truncated multiplication circuitry (e.g., a MUL, a MAC, or circuitry 400 in FIG. 4) to implement the processes and procedures as illustrated and described in association with FIGS. 1A-4. The truncated multiplication circuitry can be integrated in one or more components (e.g., host unit 220, command processor 204, first operation unit 2020, or second operation unit 2022) in FIGS. 2A-2C. In some embodiments, method 500 can be implemented as a computer program product (e.g., embodied in a non-transitory computer-readable medium) that includes computer-executable instructions (e.g., program codes or processor instructions) to be executed by the truncated multiplication circuitry. In some embodiments, method 500 can be implemented as a hardware product (e.g., including any combination of a control register, control circuitry, detection circuitry, a truncation column register, compensation circuitry, a compensation register, or any other logic or storage circuitry). In some embodiments, method 500 can be implemented as a software product (e.g., a non-transitory computer-readable medium storing computer-executable instructions, such as RISC-V format instructions). The hardware product can be a standalone or integrated part of any of the configurations or architectures as shown in FIGS. 2A-2C.

At step 502, the truncated multiplication circuitry can determine (e.g., by multiplier 408 in FIG. 4) a partial product (e.g., a row in partial product matrix 196 in FIG. 1C) of a multiplier (e.g., signed multiplier 194 in FIG. 1C or activation 410 in FIG. 4) and a multiplicand (e.g., signed multiplier 195 in FIG. 1C or weight 412 in FIG. 4) in response to receiving the multiplier and the multiplicand. The "receiving," as used herein, can refer to accepting, taking in, admitting, gaining, acquiring, retrieving, obtaining, reading, accessing, collecting, or any operation for inputting. In some embodiments, a bit width (e.g., 32 bits) of the truncated multiplication circuitry can be greater than at least one of a bit width (e.g., 8 bits) of the multiplier or a bit width (e.g., 16 bits) of the multiplicand.

At step 504, the truncated multiplication circuitry can receive a first value representing truncating a most significant bit (MSB) of the partial product and a value representing a truncation mode. For example, the truncated multiplication circuitry can receive the first value from a first section (e.g., first section 302 in FIG. 3) of its control register (e.g., control register 300 in FIG. 3), and can receive the second value from a second section (e.g., second section 304 in FIG. 3) of its control register.

At step 504, the truncated multiplication circuitry can truncate the MSB of the partial product based on the truncation mode. For example, the truncated multiplication circuitry can include control circuitry for truncating the MSB.

In some embodiments, at step 504, the truncated multiplication circuitry can truncate a first-mode length of MSBs of the partial product if the truncation mode is a first truncation mode, or truncate a second-mode length of MSBs of the partial product if the truncation mode is a second truncation mode. For example, the truncated multiplication circuitry can include detection circuitry to determine the first-mode length or the second-mode length. The first truncation mode, second truncation mode, first-mode length, second-mode length, and the detection circuitry are detailed in the above description and will not be repeated for ease of explanation, unless expressly stated differently.

In some embodiments, the truncated multiplication circuitry can receive a value representing enabling the truncated multiplication circuitry to determine the first-mode length or the second-mode length, and determine the first-mode length or the second-mode length. For example, the truncated multiplication circuitry can receive the value representing enabling the truncated multiplication circuitry to determine the first-mode length or the second-mode length from a third section (e.g., third section 306 in FIG. 3) of its control register (e.g., control register 300 in FIG. 3).

In some embodiments, if the truncation mode is the first truncation mode, to determine the first-mode length, the truncated multiplication circuitry can receive a value (e.g., from fourth section 308 of control register 300 in FIG. 3) representing a first preset length and a value representing a second preset length. The truncated multiplication circuitry can then determine whether values of the first preset length of MSBs of the multiplier are the same and whether values of the first preset length of MSBs of the multiplicand are the same. If so, the truncated multiplication circuitry can further determine the first-mode length based on the first preset length. Otherwise, the truncated multiplication circuitry can determine whether the values of the second preset length of MSBs of the multiplier are the same and whether the values of the second preset length of MSB s of the multiplicand are the same. The second preset length (e.g., 18 bits) can be shorter than the first preset length (e.g., 26 bits).

In some embodiments, if the truncation mode is the second truncation mode, to determine the second-mode length, the truncated multiplication circuitry can determine a first length of all MSBs having the same value in the multiplier and a second length of all MSBs having the same value in the multiplicand, and determine the second-mode length based on the first length and the second length.

Consistent with some embodiments of this disclosure, the truncated multiplication circuitry can further receive (e.g., from first section 302 of control register 300 in FIG. 3) at least one of a second value representing truncating a least significant bit (LSB) of the partial product or a third value representing truncating the MSB and the LSB of the partial product. The truncated multiplication circuitry can truncate the LSB of the partial product based on the truncation mode in response to receiving the second value. The truncated multiplication circuitry can truncate the MSB and the LSB of the partial product based on the truncation mode in response to receiving the third value.

Consistent with some embodiments of this disclosure, the truncated multiplication circuitry can further receive (e.g., from fifth section 310 of control register 300 in FIG. 3) a value representing a compensation mode. In some embodiments, if the compensation mode represents hardware compensation, the truncated multiplication circuitry can further receive (e.g., from sixth section 312 of control register 300 in FIG. 3) a value representing a hardware compensation scheme. The truncated multiplication circuitry can the generate (e.g., by compensation circuitry thereof) a compensation value (e.g., a hardware-based compensation value) based on the hardware compensation scheme. In some embodiments, if the compensation mode represents software compensation, the truncated multiplication circuitry can receive a compensation value (e.g., a software-based compensation value) from an external source (e.g., stored in compensation register 420 in FIG. 4).

In some embodiments, the truncated multiplication circuitry can determine (e.g., by multiplier 408 in FIG. 4) a truncated product of the multiplier and the multiplicand based on the partial product, and add (e.g., by adder 416 in FIG. 4) the compensation value to the truncated product.

By applying the disclosed methods, systems, and apparatuses for truncated multiplication, truncated multiplication circuitry can be highly programmable to truncate any combination of MSBs or LSBs of the partial products during the multiplication in response to requirements of various applications. By doing so, such truncated multiplication circuitry can achieve even higher flexibility in balancing different demands between computation precision, computation complexity, and power consumption. In scenarios that power savings having higher priority than computation precisions, such truncated multiplication circuitry can reduce its power consumption to an even lower level compared with existing solutions that only truncates LSBs. In situations when the truncated multiplication circuitry truncates only MSBs, not only its power consumption can be lowered, but its precision of the final result can be unaffected.

Moreover, by using control bits, the disclosed truncated multiplication circuitry can be controlled in real time, and the power-precision tradeoff can be adjusted in the runtime of the applications (e.g., a neural network model such as a DNN) by dynamically changing truncation modes, truncation levels, and compensation modes. Further, the disclosed truncated multiplication circuitry also provide hardware-based solution for determining the length of MSBs to be truncated, which can provide higher speed in execution and lower power consumption.

It should be noted that, the disclosed truncated multiplication circuitry can be implemented in various architectures of arithmetic logic units, such as a Baugh-Wooley multiplier, a Booth-Wallace tree multiplier, an array multiplier, a Dadda tree multiplier, or a canonical signed digit multiplier, and this disclosure does not limit such implementations to the example embodiments described herein. It should also be noted that, the disclosure truncated multiplication circuitry can be integrated into various processor architectures, such as a RISC-V CPU, an x86 CPU, an x64 CPU, a microprocessor without interlocked pipelined stages (MIPS) CPU, an Acorn RISC machine (ARM) CPU, a GPU, or dedicated processor, and this disclosure does not limit such integrations to the example embodiments described herein.

In some embodiments, a non-transitory computer-readable storage medium including instructions is also provided, and the instructions can be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device can include one or more processors (CPUs), an input/output interface, a network interface, and/or a memory.

The embodiments can further be described using the following clauses:

1. Truncated multiplication circuitry, comprising:
   a control register comprising:
      a first section configured to store a first value representing truncating a most significant bit (MSB) of a partial product of a multiplier and a multiplicand, and
      a second section configured to store a value representing a truncation mode; and
   control circuitry configured to truncate the MSB of the partial product based on the truncation mode if the first section stores the first value.

2. The truncated multiplication circuitry of clause 1, wherein the first section stores the first value, the second section is further configured to store a value representing a first truncation mode or a value representing a second truncation mode, and the control circuitry is further configured to:
   truncate a first-mode length of MSBs of the partial product if the second section stores the value representing the first truncation mode; or truncate a second-mode length of MSBs of the partial product if the second section stores the value representing the second truncation mode.

3. The truncated multiplication circuitry of clause 2, further comprising a detection circuitry configured to determine the first-mode length or the second-mode length, and the control register further comprises a third section configured to store a value representing enabling the detection circuitry to determine the first-mode length or the second-mode length.

4. The truncated multiplication circuitry of clause 3, wherein the third section is configured to store the value representing enabling the detection circuitry to determine the first-mode length or the second-mode length, the second section is configured to store the value representing the first truncation mode, and the detection circuitry is further configured to:
determine whether values of a first preset length of MSBs of the multiplier are the same and whether values of the first preset length of MSBs of the multiplicand are the same;
determine the first-mode length based on the first preset length if the values of the first preset length of MSBs of the multiplier are the same and the values of the first preset length of MSBs of the multiplicand are the same; and
if the values of the first preset length of MSBs of the multiplier are not the same or the values of the first preset length of MSB s of the multiplicand are not the same, determine whether the values of a second preset length of MSBs of the multiplier are the same and whether the values of the second preset length of MSBs of the multiplicand are the same, wherein the second preset length is shorter than the first preset length.

5. The truncated multiplication circuitry of clause 4, wherein the control register further comprises a fourth section configured to store a value representing the first preset length and a value representing the second preset length.

6. The truncated multiplication circuitry of clause 3, wherein the third section is configured to store the value representing enabling the detection circuitry to determine the first-mode length or the second-mode length, the second section is configured to store the value representing the second truncation mode, and the detection circuitry is further configured to:
determine a first length of all MSBs having the same value in the multiplier and a second length of all MSBs having the same value in the multiplicand; and
determine the second-mode length based on the first length and the second length.

7. The truncated multiplication circuitry of any of clauses 1-6, further comprising a truncation column register configured to store a value representing a position of the MSB in the partial product.

8. The truncated multiplication circuitry of any of clauses 1-7, wherein the first section is further configured to store at least one of a second value representing truncating a least significant bit (LSB) of the partial product or a third value representing truncating the MSB and the LSB of the partial product, and the control circuitry is further configured to:
truncate the LSB of the partial product based on the truncation mode if the first section stores the second value; or
truncate the MSB and the LSB of the partial product based on the truncation mode if the first section stores the third value.

9. The truncated multiplication circuitry of any of clauses 1-8, wherein the control register further comprises a fifth section configured to store a value representing a compensation mode.

10. The truncated multiplication circuitry of clause 9, wherein the fifth section is configured to store a value representing hardware compensation, the control register further comprises a sixth section configured to store a value representing a hardware compensation scheme, and wherein the truncated multiplication circuitry further comprises a compensation circuitry configured to generate a compensation value based on the hardware compensation scheme.

11. The truncated multiplication circuitry of clause 9, wherein the fifth section is configured to store a value representing software compensation, and wherein the control circuitry is further configured to receive a compensation value from an external source.

12. The truncated multiplication circuitry of any of clauses 10-11, wherein the control circuitry is further configured to:
determine a truncated product of the multiplier and the multiplicand based on the partial product; and
add the compensation value to the truncated product.

13. The truncated multiplication circuitry of any of clauses 10-12, further comprising a compensation register configured to store the compensation value.

14. The truncated multiplication circuitry of clause 9, wherein the fifth section is configured to store a value representing disabling compensation.

15. The truncated multiplication circuitry of any of clauses 1-14, wherein the control circuitry is configured to execute a set of instructions in at least one of a reduced-instruction-set-computer-V (RISC-V) format, an x86 format, an x64 format, a microprocessor without interlocked pipelined stages (MIPS) format, or an Acorn RISC machine (ARM) format.

16. A non-transitory computer-readable storage medium storing a set of instructions that is executable by truncated multiplication circuitry to cause the truncated multiplication circuitry to perform a method, the method comprising:
in response to receiving a multiplier and a multiplicand, determining a partial product of the multiplier and the multiplicand;
receiving a first value representing truncating a most significant bit (MSB) of the partial product and a value representing a truncation mode; and
truncating the MSB of the partial product based on the truncation mode.

17. The non-transitory computer-readable storage medium of clause 16, wherein truncating the MSB of the partial product based on the truncation mode comprises:
if the truncation mode is a first truncation mode, truncating a first-mode length of MSBs of the partial product; or
if the truncation mode is a second truncation mode, truncating a second-mode length of MSBs of the partial product.

18. The non-transitory computer-readable storage medium of clause 17, wherein the set of instructions that is executable by the truncated multiplication circuitry causes the truncated multiplication circuitry to further perform:

receiving a value representing enabling the truncated multiplication circuitry to determine the first-mode length or the second-mode length; and determining the first-mode length or the second-mode length.

19. The non-transitory computer-readable storage medium of clause 18, wherein the truncation mode is the first truncation mode, and determining the first-mode length or the second-mode length comprises:

receiving a value representing a first preset length and a value representing a second preset length;

determining whether values of the first preset length of MSBs of the multiplier are the same and whether values of the first preset length of MSBs of the multiplicand are the same;

determining the first-mode length based on the first preset length if the values of the first preset length of MSBs of the multiplier are the same and the values of the first preset length of MSBs of the multiplicand are the same; and if the values of the first preset length of MSBs of the multiplier are not the same or the values of the first preset length of MSBs of the multiplicand are not the same, determining whether the values of the second preset length of MSBs of the multiplier are the same and whether the values of the second preset length of MSBs of the multiplicand are the same, wherein the second preset length is shorter than the first preset length.

20. The non-transitory computer-readable storage medium of clause 18, wherein the truncation mode is the second truncation mode, and determining the first-mode length or the second-mode length comprises:

determining a first length of all MSB s having the same value in the multiplier and a second length of all MSBs having the same value in the multiplicand; and determining the second-mode length based on the first length and the second length.

21. The non-transitory computer-readable storage medium of any of clauses 16-20, wherein the set of instructions that is executable by the truncated multiplication circuitry causes the truncated multiplication circuitry to further perform:

receiving at least one of a second value representing truncating a least significant bit (LSB) of the partial product or a third value representing truncating the MSB and the LSB of the partial product;

truncating the LSB of the partial product based on the truncation mode in response to receiving the second value; and truncating the MSB and the LSB of the partial product based on the truncation mode in response to receiving the third value.

22. The non-transitory computer-readable storage medium of any of clauses 16-21, wherein the set of instructions that is executable by the truncated multiplication circuitry causes the truncated multiplication circuitry to further perform:

receiving a value representing a compensation mode.

23. The non-transitory computer-readable storage medium of clause 22, wherein the set of instructions that is executable by the truncated multiplication circuitry causes the truncated multiplication circuitry to further perform:

if the compensation mode represents hardware compensation, receiving a value representing a hardware compensation scheme; and generating a compensation value based on the hardware compensation scheme.

24. The non-transitory computer-readable storage medium of clause 22, wherein the set of instructions that is executable by the truncated multiplication circuitry causes the truncated multiplication circuitry to further perform:

if the compensation mode represents software compensation, receiving a compensation value from an external source.

25. The non-transitory computer-readable storage medium of any of clauses 23-24, wherein the set of instructions that is executable by the truncated multiplication circuitry causes the truncated multiplication circuitry to further perform:

determining a truncated product of the multiplier and the multiplicand based on the partial product; and adding the compensation value to the truncated product.

26. The non-transitory computer-readable storage medium of any of clauses 16-25, wherein a bit width of the truncated multiplication circuitry is greater than at least one of a bit width of the multiplier or a bit width of the multiplicand.

27. An apparatus, comprising:

at least one memory for storing instructions; and truncated multiplication circuitry configured to execute the instructions to cause the apparatus to perform:

in response to receiving a multiplier and a multiplicand, determining a partial product of the multiplier and the multiplicand;

receiving a first value representing truncating a most significant bit (MSB) of the partial product and a value representing a truncation mode; and truncating the MSB of the partial product based on the truncation mode.

28. The apparatus of clause 27, wherein truncating the MSB of the partial product based on the truncation mode comprises:

if the truncation mode is a first truncation mode, truncating a first-mode length of MSBs of the partial product; or if the truncation mode is a second truncation mode, truncating a second-mode length of MSBs of the partial product.

29. The apparatus of clause 28, wherein the truncated multiplication circuitry is further configured to execute the instructions to cause the apparatus to perform:

receiving a value representing enabling the truncated multiplication circuitry to determine the first-mode length or the second-mode length; and determining the first-mode length or the second-mode length.

30. The apparatus of clause 29, wherein the truncation mode is the first truncation mode, and determining the first-mode length or the second-mode length comprises:

receiving a value representing a first preset length and a value representing a second preset length;

determining whether values of the first preset length of MSBs of the multiplier are the same and whether values of the first preset length of MSBs of the multiplicand are the same;

determining the first-mode length based on the first preset length if the values of the first preset length of MSBs of the multiplier are the same and the values of the first preset length of MSBs of the multiplicand are the same; and if the values of the first preset length of MSBs of the multiplier are not the same or the values of the first preset length of MSBs of the multiplicand are not the same, determining whether the values of the second preset length of MSBs of the multiplier are the same and whether the values of the second preset length of MSBs of the multiplicand are the same, wherein the second preset length is shorter than the first preset length.

31. The apparatus of clause 29, wherein the truncation mode is the second truncation mode, and determining the first-mode length or the second-mode length comprises:

determining a first length of all MSB s having the same value in the multiplier and a second length of all MSBs having the same value in the multiplicand; and determining the second-mode length based on the first length and the second length.

32. The apparatus of any of clauses 27-31, wherein the truncated multiplication circuitry is further configured to execute the instructions to cause the apparatus to perform:

receiving at least one of a second value representing truncating a least significant bit (LSB) of the partial product or a third value representing truncating the MSB and the LSB of the partial product;

truncating the LSB of the partial product based on the truncation mode in response to receiving the second value; and truncating the MSB and the LSB of the partial product based on the truncation mode in response to receiving the third value.

33. The apparatus of any of clauses 27-32, wherein the truncated multiplication circuitry is further configured to execute the instructions to cause the apparatus to perform:

receiving a value representing a compensation mode.

34. The apparatus of clause 33, wherein the truncated multiplication circuitry is further configured to execute the instructions to cause the apparatus to perform:

if the compensation mode represents hardware compensation, receiving a value representing a hardware compensation scheme; and generating a compensation value based on the hardware compensation scheme.

35. The apparatus of clause 33, wherein the truncated multiplication circuitry is further configured to execute the instructions to cause the apparatus to perform:

if the compensation mode represents software compensation, receiving a compensation value from an external source.

36. The apparatus of any of clauses 34-35, wherein the truncated multiplication circuitry is further configured to execute the instructions to cause the apparatus to perform:

determining a truncated product of the multiplier and the multiplicand based on the partial product; and adding the compensation value to the truncated product.

37. The apparatus of any of clauses 27-36, wherein a bit width of the truncated multiplication circuitry is greater than at least one of a bit width of the multiplier or a bit width of the multiplicand.

38. A method implemented by truncated multiplication circuitry, comprising:

in response to receiving a multiplier and a multiplicand, determining a partial product of the multiplier and the multiplicand;

receiving a first value representing truncating a most significant bit (MSB) of the partial product and a value representing a truncation mode; and truncating the MSB of the partial product based on the truncation mode.

39. The method of clause 38, wherein truncating the MSB of the partial product based on the truncation mode comprises:

if the truncation mode is a first truncation mode, truncating a first-mode length of MSBs of the partial product; or if the truncation mode is a second truncation mode, truncating a second-mode length of MSBs of the partial product.

40. The method of clause 39, further comprising:

receiving a value representing enabling the truncated multiplication circuitry to determine the first-mode length or the second-mode length; and determining the first-mode length or the second-mode length.

41. The method of clause 40, wherein the truncation mode is the first truncation mode, and determining the first-mode length or the second-mode length comprises:

receiving a value representing a first preset length and a value representing a second preset length;

determining whether values of the first preset length of MSBs of the multiplier are the same and whether values of the first preset length of MSBs of the multiplicand are the same;

determining the first-mode length based on the first preset length if the values of the first preset length of MSBs of the multiplier are the same and the values of the first preset length of MSBs of the multiplicand are the same; and if the values of the first preset length of MSBs of the multiplier are not the same or the values of the first preset length of MSBs of the multiplicand are not the same, determining whether the values of the second preset length of MSBs of the multiplier are the same and whether the values of the second preset length of MSBs of the multiplicand are the same, wherein the second preset length is shorter than the first preset length.

42. The method of clause 40, wherein the truncation mode is the second truncation mode, and determining the first-mode length or the second-mode length comprises:

determining a first length of all MSBs having the same value in the multiplier and a second length of all MSBs having the same value in the multiplicand; and determining the second-mode length based on the first length and the second length.

43. The method of any of clauses 38-42, further comprising:

receiving at least one of a second value representing truncating a least significant bit (LSB) of the partial product or a third value representing truncating the MSB and the LSB of the partial product; and performing one of:

truncating the LSB of the partial product based on the truncation mode in response to receiving the second value; or truncating the MSB and the LSB of the partial product based on the truncation mode in response to receiving the third value.

44. The method of any of clauses 38-43, further comprising: receiving a value representing a compensation mode.

45. The method of clause 44, further comprising:
if the compensation mode represents hardware compensation, receiving a value representing a hardware compensation scheme; and
generating a compensation value based on the hardware compensation scheme.

46. The method of clause 44, further comprising:
if the compensation mode represents software compensation, receiving a compensation value from an external source.

47. The method of any of clauses 45-46, further comprising:
determining a truncated product of the multiplier and the multiplicand based on the partial product; and
adding the compensation value to the truncated product.

48. The method of any of clauses 38-47, wherein a bit width of the truncated multiplication circuitry is greater than at least one of a bit width of the multiplier or a bit width of the multiplicand.

49. An apparatus, comprising:
a host processor; and
accelerator circuitry comprising truncated multiplication circuitry, the truncated multiplication circuitry configured to execute instructions to cause the accelerator circuitry to perform:
in response to receiving a multiplier and a multiplicand, determining a partial product of the multiplier and the multiplicand;
receiving a first value representing truncating a most significant bit (MSB) of the partial product and a value representing a truncation mode; and
truncating the MSB of the partial product based on the truncation mode.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. As used herein, the indefinite articles "a" and "an" mean "one or more." Similarly, the use of a plural term does not necessarily denote a plurality unless it is unambiguous in the given context.

As used herein, unless specifically stated otherwise, the term "or" encompasses all possible combinations, except where infeasible. For example, if it is stated that a component can include A or B, then, unless specifically stated otherwise or infeasible, the component can include A, or B, or A and B. As a second example, if it is stated that a component can include A, B, or C, then, unless specifically stated otherwise or infeasible, the component can include A, or B, or C, or A and B, or A and C, or B and C, or A and B and C.

It is appreciated that the above described embodiments can be implemented by hardware, or software (program codes), or a combination of hardware and software. If implemented by software, it can be stored in the above-described computer-readable media. The software, when executed by the processor can perform the disclosed methods. The computing units and other functional units described in the present disclosure can be implemented by hardware, or software, or a combination of hardware and software. One of ordinary skill in the art will also understand that multiple ones of the above described modules/units can be combined as one module/unit, and each of the above described modules/units can be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as example only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. Truncated multiplication circuitry, comprising:
a control register comprising:
a first section configured to store a first value representing truncating a most significant bit (MSB) of a partial product of a multiplier and a multiplicand, and
a second section configured to store a value representing a first truncation mode or a value representing a second truncation mode; and
control circuitry configured to:
truncate the MSB of the partial product based on the truncation mode if the first section stores the first value;
truncate a first-mode length of MSBs of the partial product if the second section stores the value representing the first truncation mode; and
truncate a second-mode length of MSBs of the partial product if the second section stores the value representing the second truncation mode.

2. The truncated multiplication circuitry of claim 1, further comprising a detection circuitry configured to determine the first-mode length of MSBs or the second-mode length of MSBs, and the control register further comprises a third section configured to store a value representing enabling the detection circuitry to determine the first-mode length of MSBs or the second-mode length of MSBs.

3. The truncated multiplication circuitry of claim 2, wherein the third section is configured to store the value representing enabling the detection circuitry to determine the first-mode length of MSBs or the second-mode length of MSBs, the second section is configured to store the value representing the first truncation mode, and the detection circuitry is further configured to:

determine whether values of a first preset length of MSBs of the multiplier are the same and whether values of the first preset length of MSBs of the multiplicand are the same;

determine the first-mode length of MSBs based on the first preset length of MSBs if the values of the first preset length of MSBs of the multiplier are the same and the values of the first preset length of MSBs of the multiplicand are the same; and if the values of the first preset length of MSBs of the multiplier are not the same or the values of the first preset length of MSBs of the multiplicand are not the same, determine whether the values of a second preset length of MSBs of the multiplier are the same and whether the values of the second preset length of MSBs of the multiplicand are the same, wherein the second preset length of MSBs is shorter than the first preset length of MSBs.

4. The truncated multiplication circuitry of claim 2, wherein the third section is configured to store the value representing enabling the detection circuitry to determine the first-mode length of MSBs or the second-mode length of MSBs, the second section is configured to store the value representing the second truncation mode, and the detection circuitry is further configured to:

determine a first length of all MSBs having a same value in the multiplier and a second length of all MSBs having a same value in the multiplicand; and determine the second-mode length of MSBs based on the first length of all MSBs and the second length of all MSBs.

5. The truncated multiplication circuitry of claim 1, further comprising a truncation column register configured to store a value representing a position of the MSB in the partial product.

6. The truncated multiplication circuitry of claim 1, wherein the first section is further configured to store at least one of a second value representing truncating a least significant bit (LSB) of the partial product or a third value representing truncating the MSB and the LSB of the partial product, and the control circuitry is further configured to:

truncate the LSB of the partial product based on the truncation mode if the first section stores the second value; or truncate the MSB and the LSB of the partial product based on the truncation mode if the first section stores the third value.

7. The truncated multiplication circuitry of claim 1, wherein the control register further comprises a fifth section configured to store a value representing a compensation mode.

8. The truncated multiplication circuitry of claim 7, wherein the fifth section is configured to store a value representing hardware compensation, the control register further comprises a sixth section configured to store a value representing a hardware compensation scheme, and wherein the truncated multiplication circuitry further comprises a compensation circuitry configured to generate a compensation value based on the hardware compensation scheme.

9. The truncated multiplication circuitry of claim 8, wherein the control circuitry is further configured to:

determine a truncated product of the multiplier and the multiplicand based on the partial product; and add the compensation value to the truncated product.

10. The truncated multiplication circuitry of claim 7, wherein the fifth section is configured to store a value representing software compensation, and wherein the control circuitry is further configured to receive a compensation value from an external source.

11. A non-transitory computer-readable storage medium storing a set of instructions that is executable by truncated multiplication circuitry to cause the truncated multiplication circuitry to perform a method, the method comprising:

in response to receiving a multiplier and a multiplicand, determining a partial product of the multiplier and the multiplicand;

receiving a first value representing truncating a most significant bit (MSB) of the partial product and a value representing a truncation mode; and truncating the MSB of the partial product based on the truncation mode, comprising:

if the truncation mode is a first truncation mode, truncating a first-mode length of MSBs of the partial product; or if the truncation mode is a second truncation mode, truncating a second-mode length of MSBs of the partial product.

12. The non-transitory computer-readable storage medium of claim 11, wherein the set of instructions that is executable by the truncated multiplication circuitry causes the truncated multiplication circuitry to further perform:

receiving a value representing enabling the truncated multiplication circuitry to determine the first-mode length of MSBs or the second-mode length of MSBs; and determining the first-mode length of MSBs or the second-mode length of MSBs.

13. The non-transitory computer-readable storage medium of claim 12, wherein the truncation mode is the first truncation mode, and determining the first-mode length of MSBs or the second-mode length of MSBs comprises:

receiving a value representing a first preset length of MSBs and a value representing a second preset length of MSBs;

determining whether values of the first preset length of MSBs of the multiplier are the same and whether values of the first preset length of MSBs of the multiplicand are the same;

determining the first-mode length of MSBs based on the first preset length of MSBs if the values of the first preset length of MSBs of the multiplier are the same and the values of the first preset length of MSBs of the multiplicand are the same; and if the values of the first preset length of MSBs of the multiplier are not the same or the values of the first preset length of MSBs of the multiplicand are not the same, determining whether the values of the second preset length of MSBs of the multiplier are the same and whether the values of the second preset length of MSBs of the multiplicand are the same, wherein the second preset length of MSBs is shorter than the first preset length of MSBs.

14. The non-transitory computer-readable storage medium of claim 12, wherein the truncation mode is the second truncation mode, and determining the first-mode length of MSBs or the second-mode length of MSBs comprises:

determining a first length of all MSBs having a same value in the multiplier and a second length of all MSBs having a same value in the multiplicand; and determining the second-mode length of MSBs based on the first length of all MSBs and the second length of all MSBs.

15. The non-transitory computer-readable storage medium of claim 11, wherein the set of instructions that is executable by the truncated multiplication circuitry causes the truncated multiplication circuitry to further perform:
   receiving at least one of a second value representing truncating a least significant bit (LSB) of the partial product or a third value representing truncating the MSB and the LSB of the partial product;
   truncating the LSB of the partial product based on the truncation mode in response to receiving the second value; and
   truncating the MSB and the LSB of the partial product based on the truncation mode in response to receiving the third value.

16. The non-transitory computer-readable storage medium of claim 11, wherein the set of instructions that is executable by the truncated multiplication circuitry causes the truncated multiplication circuitry to further perform:
   receiving a value representing a compensation mode.

17. The non-transitory computer-readable storage medium of claim 16, wherein the set of instructions that is executable by the truncated multiplication circuitry causes the truncated multiplication circuitry to further perform:
   if the compensation mode represents hardware compensation, receiving a value representing a hardware compensation scheme; and
   generating a compensation value based on the hardware compensation scheme.

18. The non-transitory computer-readable storage medium of claim 17, wherein the set of instructions that is executable by the truncated multiplication circuitry causes the truncated multiplication circuitry to further perform:
   determining a truncated product of the multiplier and the multiplicand based on the partial product; and
   adding the compensation value to the truncated product.

19. The non-transitory computer-readable storage medium of claim 16, wherein the set of instructions that is executable by the truncated multiplication circuitry causes the truncated multiplication circuitry to further perform:
   if the compensation mode represents software compensation, receiving a compensation value from an external source.

20. An apparatus, comprising:
   a host processor; and
   accelerator circuitry comprising truncated multiplication circuitry, the truncated multiplication circuitry configured to execute instructions to cause the accelerator circuitry to perform:
      in response to receiving a multiplier and a multiplicand, determining a partial product of the multiplier and the multiplicand;
      receiving a first value representing truncating a most significant bit (MSB) of the partial product and a value representing a truncation mode; and
      truncating the MSB of the partial product based on the truncation mode, comprising:
         if the truncation mode is a first truncation mode, truncating a first-mode length of MSBs of the partial product; or
         if the truncation mode is a second truncation mode, truncating a second-mode length of MSBs of the partial product.

* * * * *